US012460045B2

(12) United States Patent
Wei et al.

(10) Patent No.: US 12,460,045 B2
(45) Date of Patent: Nov. 4, 2025

(54) IONIC POLYMERS CONTAINING SPIRO STRUCTURE AND PREPARATION METHOD AND APPLICATION THEREOF

(71) Applicant: HEFEI UNIVERSITY OF TECHNOLOGY, Hefei (CN)

(72) Inventors: Haibing Wei, Hefei (CN); Tao Jiang, Hefei (CN); Tao Wang, Hefei (CN); Yu Zhao, Hefei (CN); Xueliang Li, Hefei (CN); Shanzhong Yang, Hefei (CN); Yunsheng Ding, Hefei (CN)

(73) Assignee: HEFEI UNIVERSITY OF TECHNOLOGY, Hefei (CN)

( * ) Notice: Subject to any disclaimer, the term of this patent is extended or adjusted under 35 U.S.C. 154(b) by 0 days.

(21) Appl. No.: 18/652,820

(22) Filed: May 2, 2024

(65) Prior Publication Data
US 2024/0392061 A1 Nov. 28, 2024

(30) Foreign Application Priority Data
May 19, 2023 (CN) .......................... 202310566018.7

(51) Int. Cl.
C08G 61/12 (2006.01)
C08G 61/02 (2006.01)
(Continued)

(52) U.S. Cl.
CPC ............. *C08G 61/12* (2013.01); *C08G 61/02* (2013.01); *C08J 5/2218* (2013.01); *H01M 8/103* (2013.01);
(Continued)

(58) Field of Classification Search
CPC ........ C08G 61/02; C08G 61/12; C08G 10/00; C08G 2261/143; H01M 8/103;
(Continued)

(56) References Cited

U.S. PATENT DOCUMENTS

2021/0009726 A1* 1/2021 Yan ..................... H01M 8/1072

FOREIGN PATENT DOCUMENTS

CN 109320692 A * 2/2019 ............. C08G 61/02
CN 110746561 A 4/2020
(Continued)

OTHER PUBLICATIONS

Grisorio "Insight into the Role of Oxidation in the Thermally Induced Green Band in Fluorene-Based Systems." Adv. Funct. Mater. 2007, 17, 538-548 (Year: 2007).*
(Continued)

*Primary Examiner* — Tri V Nguyen
(74) *Attorney, Agent, or Firm* — Addison D. Ault; IPGentleman Intellectual Property Services, LLC

(57) ABSTRACT

The present invention introduces ionic polymers featuring with a spiro structure, which enhances the solubility and gas permeability of the ionic polymer while maintaining excellent conductivity, mechanical properties, and dimensional stability. This is achieved by incorporating a spiro fragment with a large free volume into the polymer backbone. As a result, the gas permeability of the catalyst layer prepared from this ionic polymer is improved, making it suitable as a catalyst binder for proton exchange membrane fuel cells (PEMFCs) or anion exchange membrane fuel cells (AEMFCs). Furthermore, the electrochemical performance of the fuel cell is enhanced. Additionally, the proton exchange membrane and anion exchange membrane derived from this ionic polymer containing a spiro structure effectively improve the conductivity of both types of membranes by increasing the space volume due to the presence of the large free volume spiro fragment.

8 Claims, 9 Drawing Sheets

(51) Int. Cl.
  *C08J 5/22*    (2006.01)
  *H01M 8/103*   (2016.01)
  *H01M 8/1058*  (2016.01)
  *H01M 8/1081*  (2016.01)

(52) U.S. Cl.
  CPC ....... *H01M 8/1058* (2013.01); *H01M 8/1081* (2013.01); *C08G 2261/143* (2013.01); *H01M 2300/0014* (2013.01)

(58) Field of Classification Search
  CPC ....... H01M 8/1081; H01M 2300/0014; H01M 4/8668; C08J 5/2218
  USPC ................................................ 252/500, 511
  See application file for complete search history.

(56) References Cited

FOREIGN PATENT DOCUMENTS

| | | |
|---|---|---|
| CN | 111954571 A | 11/2020 |
| CN | 115521443 A | 12/2022 |
| KR | 20220094370 A | 1/2024 |
| WO | 2023049459 A1 | 3/2023 |

OTHER PUBLICATIONS

Translation of CN109320692A (Year: 2025).*
Author: Dianxun Wang Title of the Article: Molecular Science and Chemical Research Date: Feb. 28, 1985 p. 15-22 City or Country where Published: China.

* cited by examiner

IONIC POLYMERS CONTAINING SPIRO STRUCTURE AND PREPARATION METHOD AND APPLICATION THEREOF

TECHNICAL FIELD

The present invention relates to the technical field of ionic polymers, and in particular to ionic polymers containing a spiro structure and their preparation method and application thereof.

BACKGROUND ART

As an efficient and clean chemical energy conversion device, polymer electrolyte fuel cells can directly convert chemical energy (hydrogen, methanol, etc.) into electrical energy. The polymer electrolyte fuel cell can be broadly classified into proton exchange membrane fuel cell (PEMFC) and anion exchange membrane fuel cell (AEMFC) according to their working environment. As a core component of fuel cells, membrane electrode assembly (MEA) is a multi-phase mass transport and electrochemical reaction site involving three-phase interfacial reactions and complex conductive mass transfer processes, which directly determines the performance, lifespan, and cost of fuel cells. Among the components of MEA, the fundamental chemical compositions of both the ion-exchange membrane and the catalyst binder are ionic polymers. However, the functions and requirements of these two components are not entirely consistent with each other. The ion exchange membrane serves a crucial role in separating the fuel from the oxidant while facilitating ion conduction. To fulfill this role effectively, it must possess key properties such as high ionic conductivity, good chemical stability, and excellent mechanical strength. As an important part of the catalyst layer of polymer electrolyte fuel cell, ionic polymer binder acts to bind catalysts, facilitates ion conduction, constructs effective three-phase interface, and carry out electrochemical reactions. The physical and chemical properties of the ionic polymer binder directly affect the performance and lifespan of the fuel cell. When employed as binders in fuel cell catalyst layers, ionic polymers must meet several essential criteria, including good solubility, high ionic conductivity, excellent chemical stability, and good gas permeability. Currently, the majority of ionomer binder materials used in PEMFC are perfluorosulfonic acid polymers. These polymers present challenges such as complicated preparation process, high cost, and serious environmental pollution associated with their preparation and recycling. While the ionomer binder materials employed in AEMFC are primarily cationic polymers containing aromatic ring units, the MEA prepared using these binder materials exhibit substantial voltage decay at high current density due to increased mass transfer resistance, which greatly limits the ultimate performance of the cell. This mass transfer resistance is primarily a result of insufficient gas permeability of the catalyst binder, making it difficult for the reactant gases to reach the surface of the coated catalyst particles. Therefore, there is an urgent need in the field of polymer electrolyte fuel cells to develop an ionic polymer that possesses outstanding mechanical properties, and excellent dimensional stability, while also exhibiting excellent gas permeability, solubility, and ionic conductivity.

SUMMARY

An object of the present invention is to provide ionic polymers containing a spiro structure, which exhibit high gas permeability and solubility while maintaining good ion conductivity, mechanical properties and dimensional stability, and their preparation method and application thereof.

To achieve the above object, the present invention provides the following technical solutions:

The present invention provides ionic polymers containing a spiro structure, having a structure as shown in Formula I:

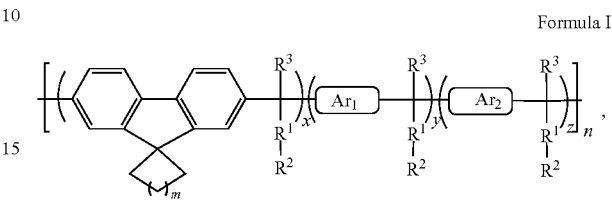

Formula I where m in Formula I determines the size of the spiro, and m is independently an integer between 2 and 4;

where x in Formula I is any number between 0.01 and 1.00, y and z are each independently any number between 0 and 0.99, x+y+z=1, and when z is 0, $R^2$ contains at least one anionic group or cationic group;

where n in Formula I represents a degree of polymerization, and n is an integer between 10 and 1,000,000;

where each $R^1$ in Formula I is independently selected from one or more of the following structures:

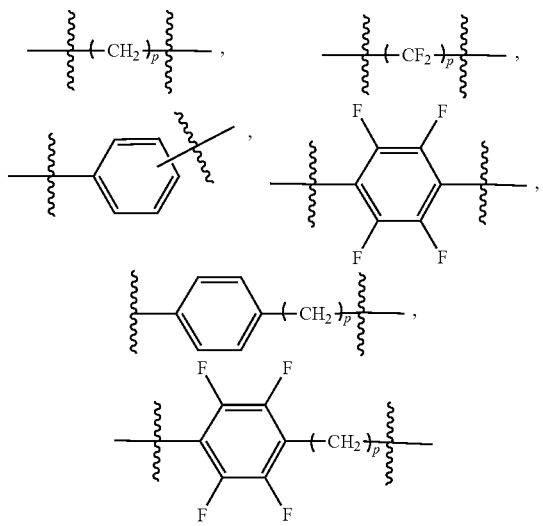

p being an integer between 1 and 15;

where each $R^2$ in Formula I is independently selected from a hydrogen atom or a cationic group, i.e. a polymer of the structure shown in Formula I is a cationic polymer containing a spiro structure, and a counter ion is an anion; $R^2$ is selected from one or more of the following structures:

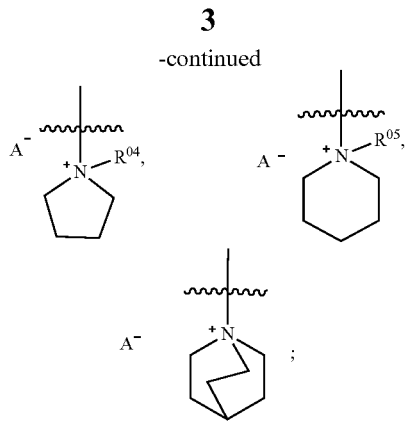

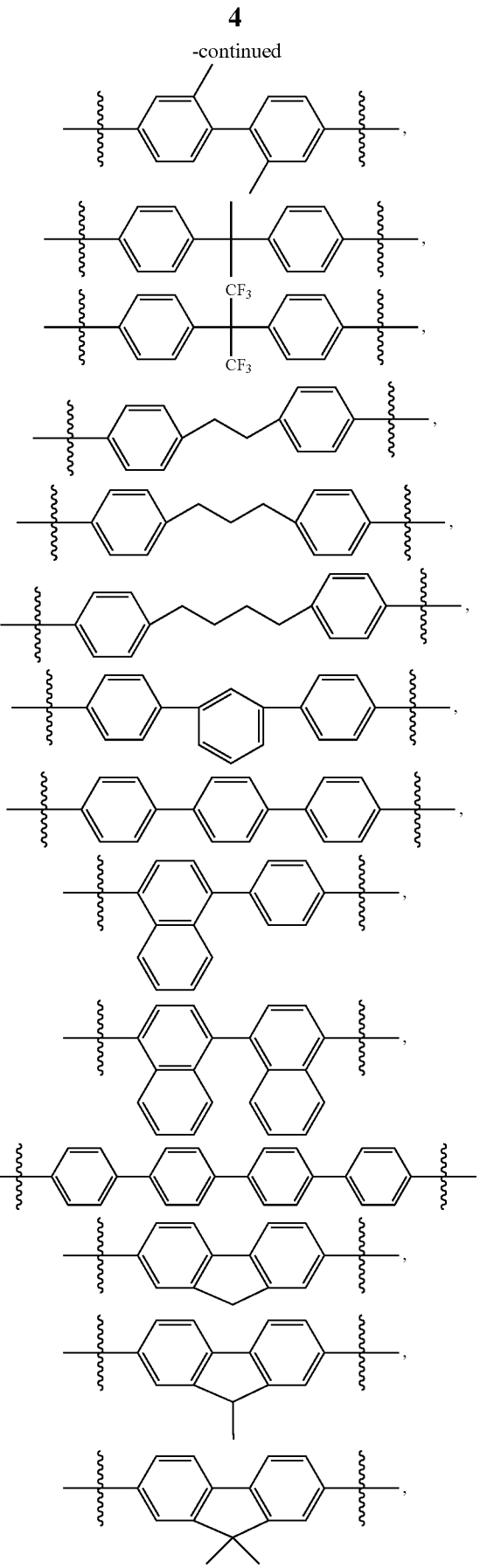

and when z=0, $R^2$ in x and y units cannot simultaneously be a hydrogen atom; $R^{01}$, $R^{02}$, $R^{03}$, $R^{04}$, and $R^{05}$ are each independently selected from a hydrocarbyl with the carbon atom number of 1 to 10; a counter anion $A^-$ is selected from a halide ion, a hydroxide ion, or a bicarbonate ion; when the polymer of the structure shown in Formula I is the cationic polymer containing the spiro structure, $R^4$ in —$Ar_2$— fragment is a quaternary ammonium cationic group if z is not 0;

or where each $R^2$ in Formula I is independently selected from a hydrogen atom or a sulfonate ion, i.e.

then the polymer of the structure shown in Formula I is an anionic polymer containing a Spiro structure, and the counter ion is a cation; and when z=0, $R^2$ in the x and y units cannot simultaneously be a hydrogen atom; a counter ion $B^+$ is selected from a hydrogen ion, a sodium ion, or a potassium ion; when the polymer of the structure shown in Formula I is the anionic polymer containing the spiro structure, $R^4$ in the —$Ar_2$— fragment is a sulfonate ion if z is not 0;

where each $R^3$ in Formula I is independently selected from one or more of the following structures:

where each —$Ar_1$— fragment in Formula I is independently selected from one or more of the following structures:

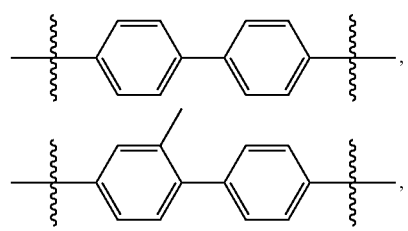

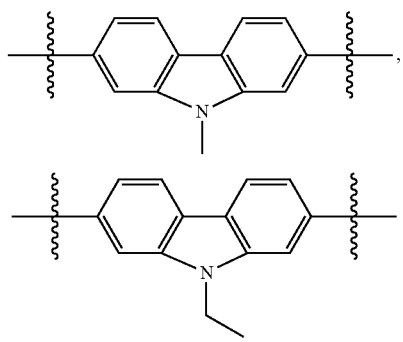

where each —Ar$_2$— fragment in Formula I is independently selected from one or more of the following ionic structures:

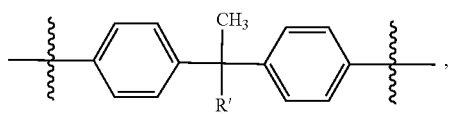

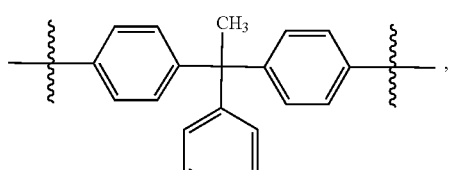

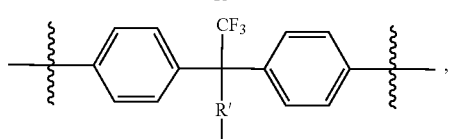

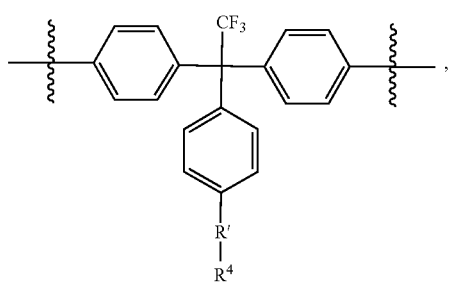

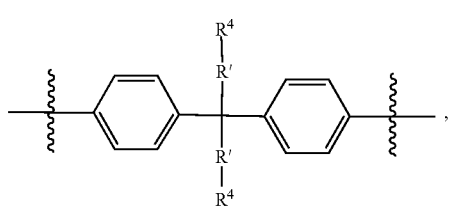

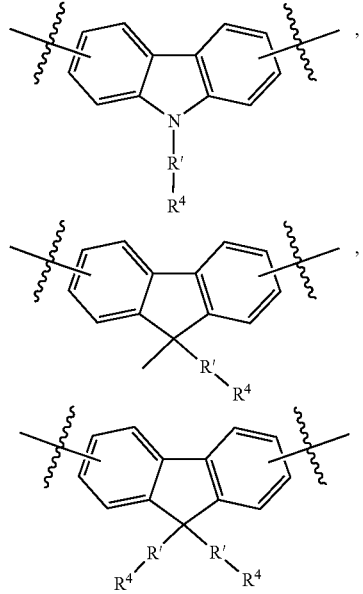

each R' being independently selected from an alkylene or an arylene group with the carbon atom number of 1 to 15; R$^4$ being a quaternary ammonium cation or sulfonate group, where if R$^4$ is the quaternary ammonium cation, R$^4$ has one or more of the following structures:

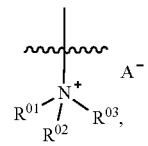

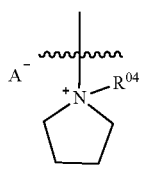 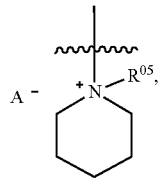

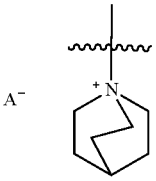

R$^{01}$, R$^{02}$, R$^{03}$, R$^{04}$, and R$^{05}$ being each independently selected from a hydrocarbyl with the carbon atom number of 1 to 10; a counter ion A being selected from a halide ion, a hydroxide ion, or a bicarbonate ion;

the counter ion B$^+$ being selected from a hydrogen ion, a sodium ion, or a potassium ion if R$^4$ is the sulfonate ion, that is,

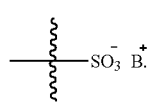

Preferably, each —Ar$_1$— fragment in Formula I is independently selected from one or more of the following structures:

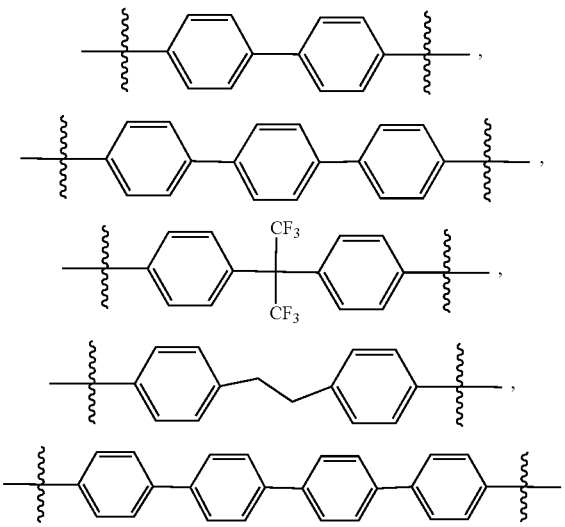

each —Ar$_2$— fragment in Formula I is independently selected from one or more of the following structures:

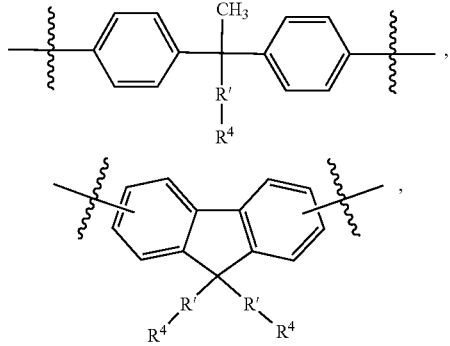

each R' being independently selected from an alkylene or an arylene group with the carbon atom number of 1 to 15; R$^4$ being an anionic group or a cationic group.

Each R$^1$ in Formula I is independently selected from one or more of the following structures:

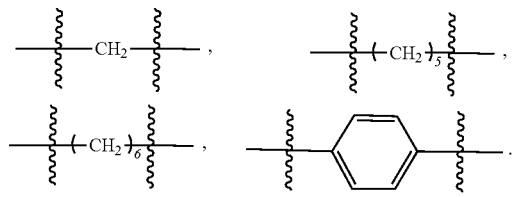

R$^2$ in Formula I is independently selected from the hydrogen atom or the cationic group, i.e. the cationic polymer containing the spiro structure, and the counter ion is the anion; R$^2$ is independently selected from

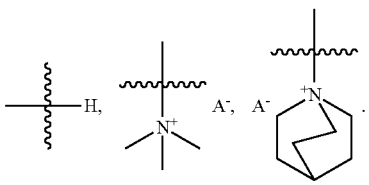

R$^2$ is independently selected from the hydrogen atom or the sulfonate ion,

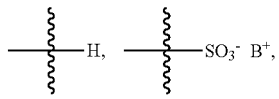

i.e. the anionic polymer containing the spiro structure, and the counter ion is the cation.

The present invention also provides a preparation method of the ionic polymer containing a spiro structure according to the above technical solution, when each R$^2$ in Formula I is independently selected from one or more of

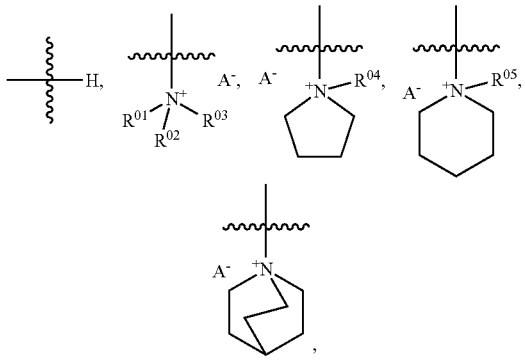

R$^4$ in Formula I is the quaternary ammonium cation, having one or more of the following structures:

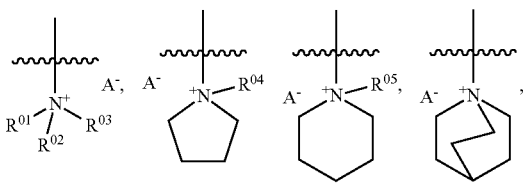

R$^{01}$, R$^{02}$, R$^{03}$, R$^{04}$, and R$^{05}$ being each independently selected from a hydrocarbyl with the carbon atom number of 1 to 10; a counter ion A$^-$ being selected from a halide ion, a hydroxide ion, or a bicarbonate ion;

the polymer of the structure shown in Formula I is a cationic polymer containing a spiro structure, and the preparation method of the cationic polymer containing the spiro structure includes the following steps:

mixing a halogen-terminated polymer precursor with the structure shown in Formula II, a first organic solvent, and a tertiary amine compound, and then carrying out a first substitution reaction to obtain the cationic polymer containing the spiro structure, Formula II

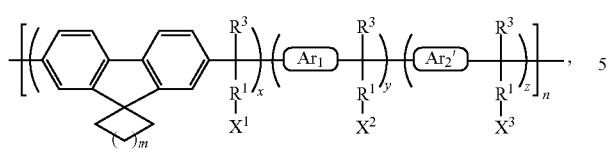

in Formula II, $X^1$, $X^2$, and $X^3$ being each independently selected from a halogen atom or a hydrogen atom, and when z=0, $X^1$ and $X^2$ being not hydrogen atoms at the same time;

in Formula II, $Ar_2'$ is an arylene unit tethering with halogen atoms, having one or more of the following structures:

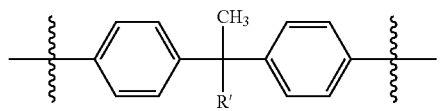,

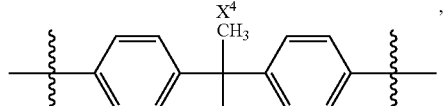,

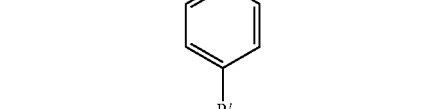,

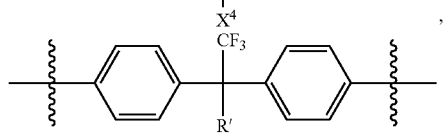,

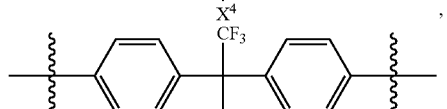,

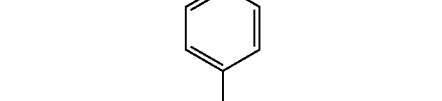,

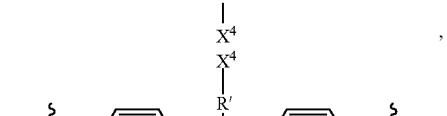,

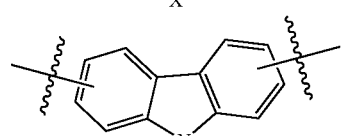,

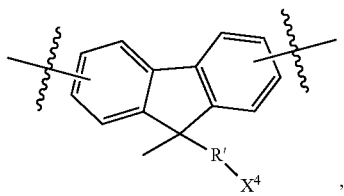,

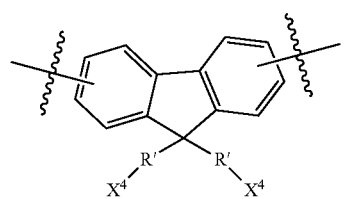, each R' being independently selected from an alkylene or an arylene group with the carbon atom number of 1 to 15, and $X^4$ being a halogen atom selected from one or more of Cl, Br, and I; and the tertiary amine compound being selected from one or more of

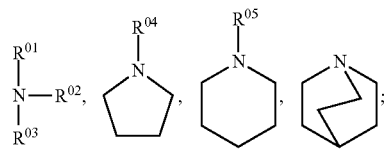

$R^{01}$, $R^{02}$, $R^{03}$, $R^{04}$, and $R^{05}$ being each independently selected from a hydrocarbyl with the carbon atom number of 1 to 10.

The present invention also provides a preparation method of the ionic polymer containing a spiro structure according to the above technical solution, when each $R^2$ in Formula I is independently selected from one or more of

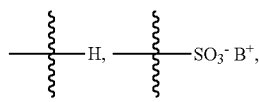

and $R^4$ is a sulfonate group, then the polymer of the structure shown in Formula I is an anionic polymer containing a spiro structure; the counter ion $B^+$ being selected from the hydrogen ion, the sodium ion, or the potassium ion; a preparation method of the anionic polymer containing the spiro structure includes the following steps:

(1) combining a halogen-terminated polymer precursor with the structure shown in Formula II with a second organic solvent and a thioacetate before carrying out a second substitution reaction to obtain a polymer precursor with a structure shown in Formula IV; the second substitution reaction is shown in Formula V:

Formula II

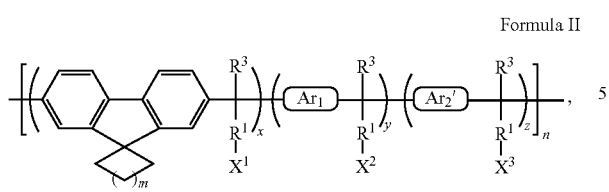

in Formula II, $X^1$, $X^2$, and $X^3$ being each independently selected from a halogen atom or a hydrogen atom, and when z=0, $X^1$ and $X^2$ being not hydrogen atoms at the same time;

in Formula II, $Ar_2'$ is an arylene unit tethering with halogen atoms, having one or more of the following structures:

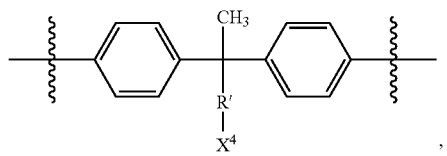

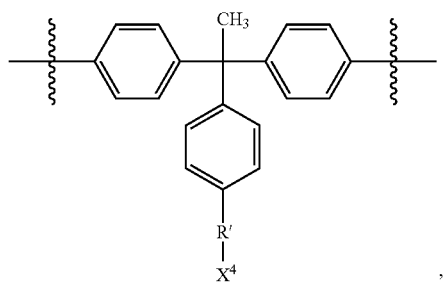

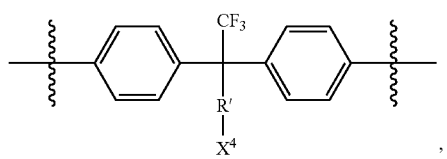

-continued

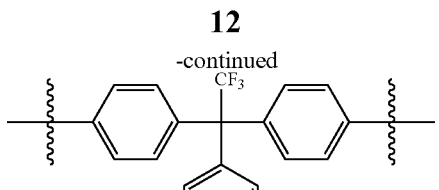

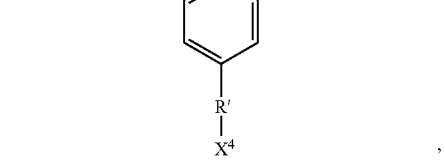

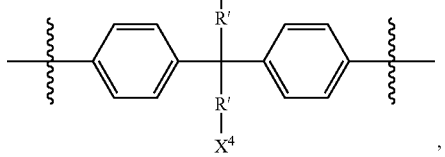

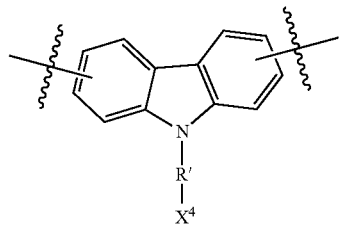

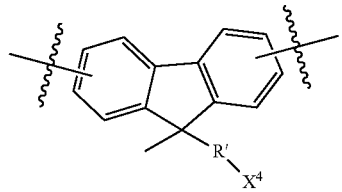

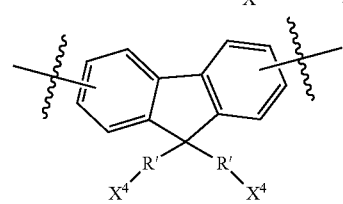

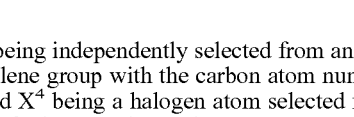

each R' being independently selected from an alkylene or an arylene group with the carbon atom number of 1 to 15, and $X^4$ being a halogen atom selected from one or more of Cl, Br, and I; and Formula V

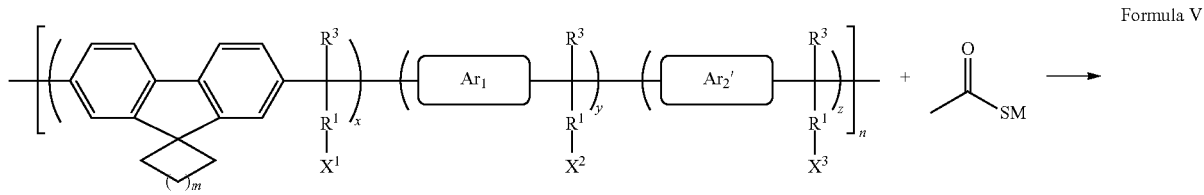

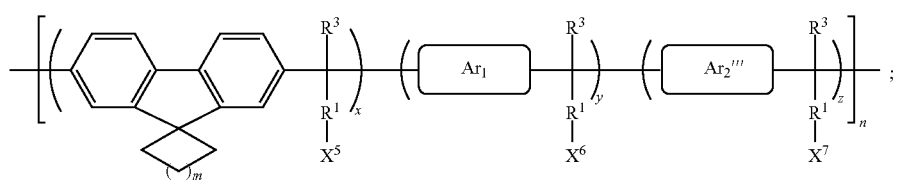

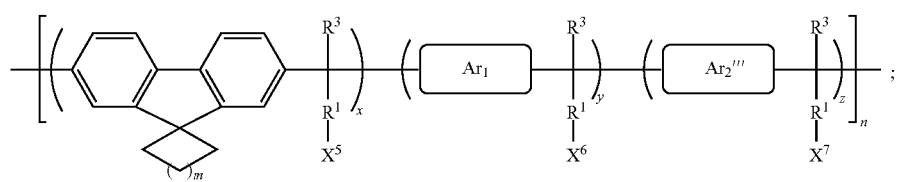

Formula IV in Formulas IV and V, $X^5$, $X^6$, and $X^7$ being each independently selected from an acetylthio group or a hydrogen atom, and when z=0, $X^5$ and $X^6$ being not hydrogen atoms at the same time;

in Formulas IV and V, —$Ar_2'''$— being an arylene unit tethering with the acetylthio group, having one or more of the following structures:

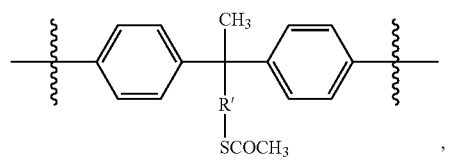

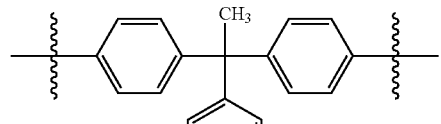

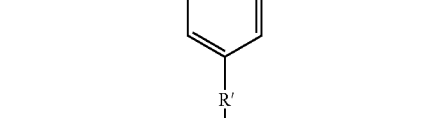

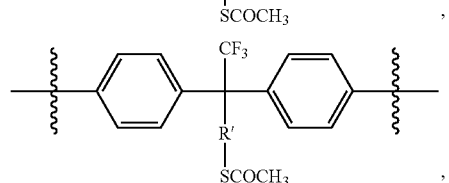

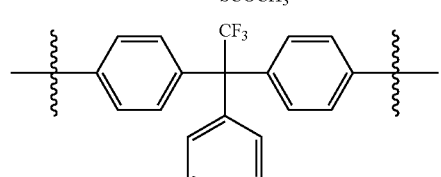

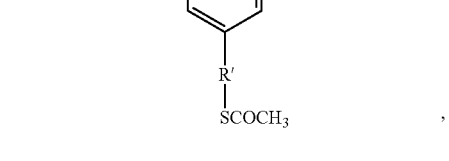

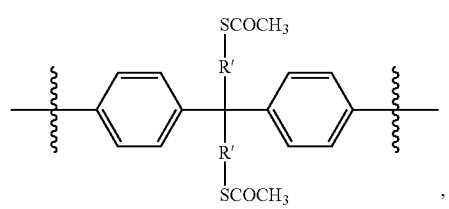

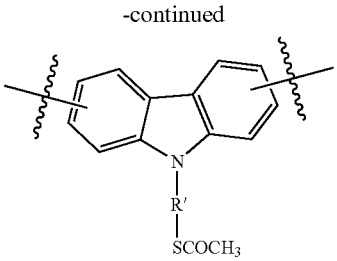

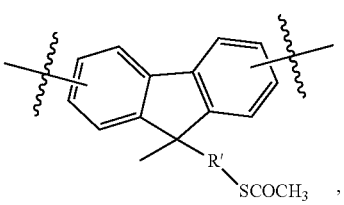

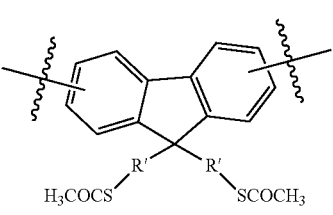

a structural formula of the thioacetate being

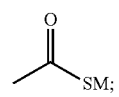

and
the thioacetate being selected from one or more of

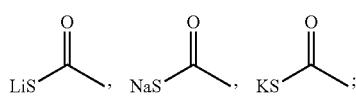

(2) performing an oxidation reaction after mixing the polymer precursor IV obtained in the step (1) with an oxidizing reagent, to obtain the anionic polymer containing the spiro structure, the oxidizing reagent being selected from one or more of a carboxylic acid solution containing hydrogen peroxide or a peroxyacid oxidant, and the peroxyacid oxidant being one or more of

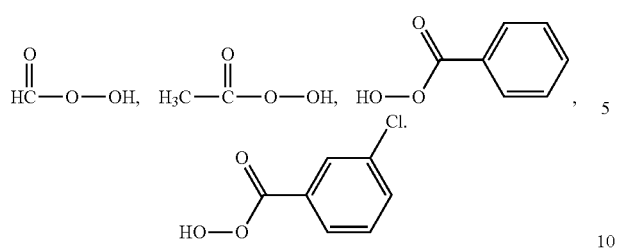

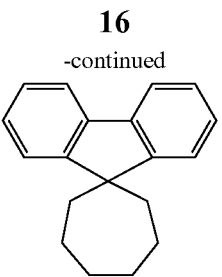

a structure of the ketone monomer is

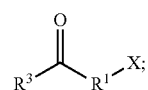

Preferably, a preparation method of the halogen-terminated polymer precursor with the structure shown in Formula II includes the following steps:

performing a polycondensation reaction after mixing a spiro-containing aromatic compound, $Ar_1'$, $Ar_2''$, a ketone monomer, and a third organic solvent and an organic strong acid, to obtain the halogen-terminated polymer precursor with the structure shown in Formula II, where the polycondensation reaction is shown in Formula III, $Ar_1'$ is an aromatic compound having one or more of the following structures:

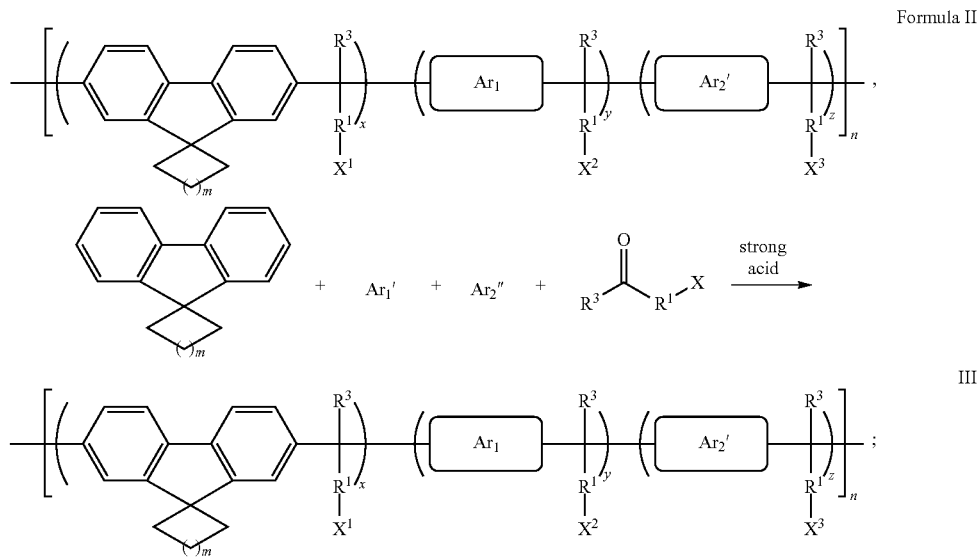

in Formula III, when the amount of $Ar_1'$ as a raw material is zero, y=0; in Formula III, when the amount of $Ar_2''$ as a raw material is zero, z=0;

in Formula III, X is independently selected from a halogen atom or a hydrogen atom, $X^1$, $X^2$, and $X^3$ are each independently selected from a halogen atom or a hydrogen atom, and when z=0, $X^1$ and $X^2$ are not hydrogen atoms at the same time;

the spiro-containing aromatic compound has one or more of the following structures:

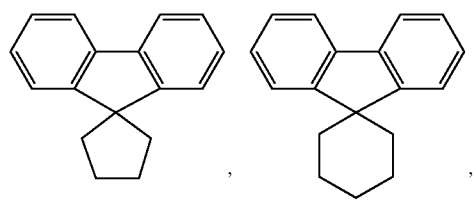

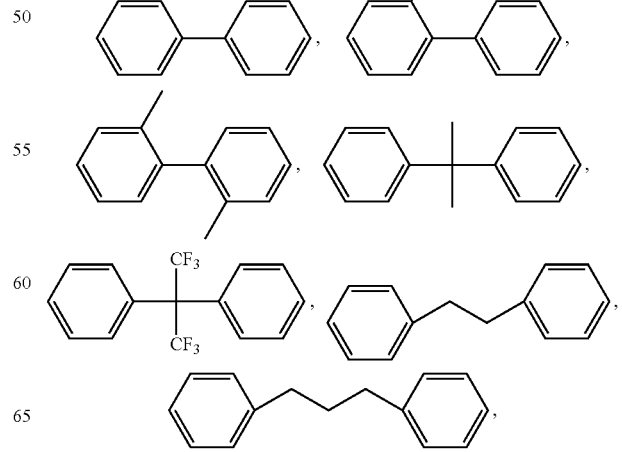

-continued

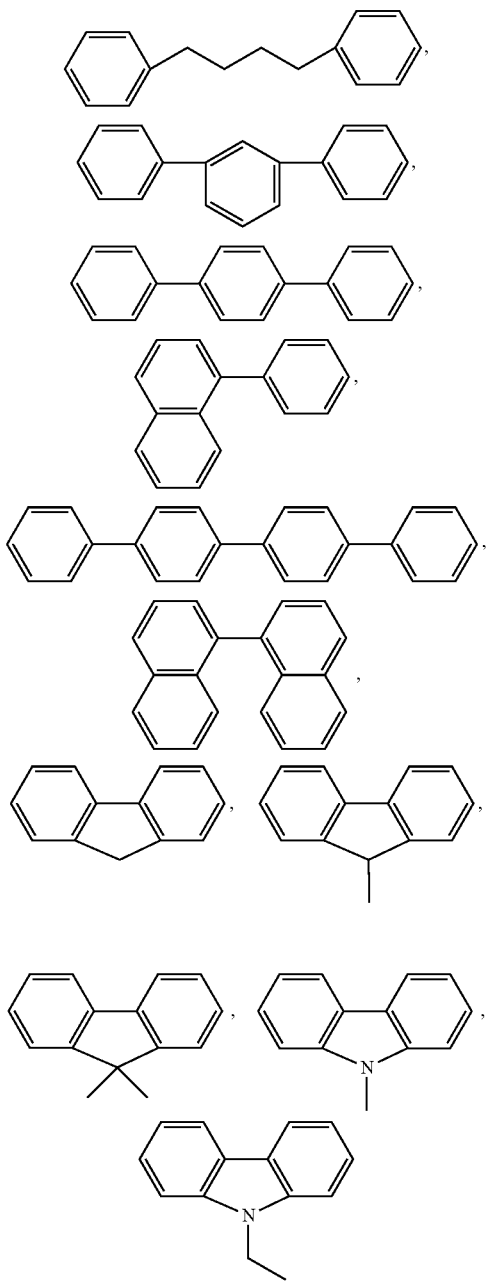

Ar$_2$″ is an aromatic compound tethering with halogen group, having one or more of the following structures:

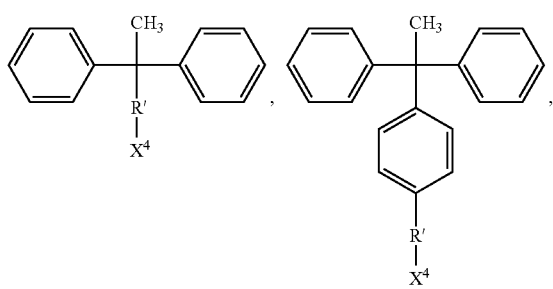

-continued

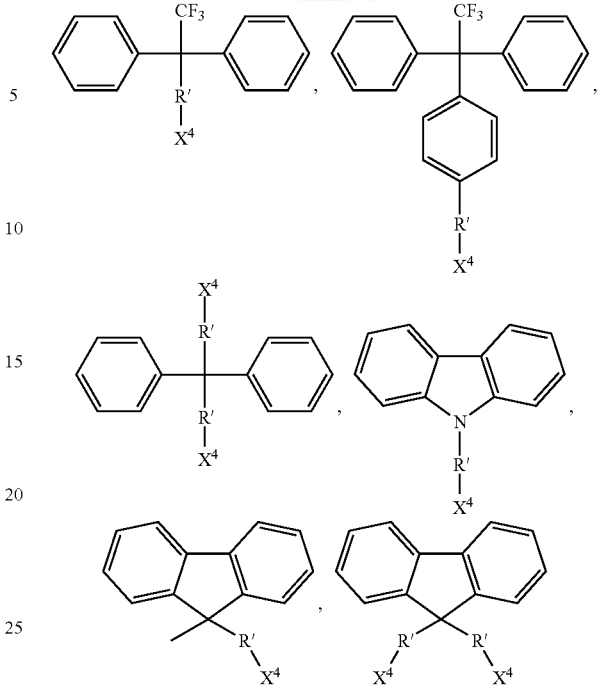

each R′ being independently selected from an alkylene or an arylene group with the carbon atom number of 1 to 15, and X$^4$ being a halogen atom selected from one or more of Cl, Br, and I.

The strong organic acid is at least one of methanesulfonic acid, trifluoromethanesulfonic acid, and trifluoroacetic acid.

The present invention also provides the application of the ionic polymer containing a spiro structure according to the above technical solution as a binder for a catalyst layer of a PEMFC or an AEMFC.

Preferably, before using the ionic polymer containing a spiro structure as a catalyst binder for a PEMFC or an AEMFC, counter ions in the ionic polymer containing a spiro structure are converted into other kinds of counter ions as needed.

The present invention also provides the application of the ionic polymer containing a spiro structure according to the above technical solution for preparing a proton exchange membrane or an anion exchange membrane.

Preferably, the preparation method of a proton exchange membrane or anion exchange membrane using the ionic polymer containing a spiro structure includes the following steps:

dissolving or dispersing the ionic polymer containing a spiro structure in an organic solvent to form a solution or dispersion of the polymer;

coating the solution or dispersion of the polymer on a substrate and then removing the solvent to obtain the proton exchange membrane or anion exchange membrane; and converting counter ions in the proton exchange membrane or anion exchange membrane into other kinds of counter ions as needed.

The present invention provides the ionic polymers containing a spiro structure, which improves the solubility and gas permeability of the ionic polymer while maintaining good conductivity, mechanical properties, and dimensional stability by introducing a large free volume of a spiro fragment into the polymer mainchain, thereby facilitating the improvement of the gas permeability of a catalyst layer prepared from the ionic polymer as a catalyst binder for a PEMFC or as a catalyst binder for an AEMFC. Furthermore, the electrochemical performance of the fuel cell is enhanced. In addition, the proton exchange membrane and the anion exchange membrane prepared from the ionic polymer containing a spiro structure can also effectively improve the conductivity of these membrane by increasing the free volume due to the presence of the spiro fragment with a large free volume. The ionic polymer is not only soluble in polar aprotic solvents such as N, N-dimethylformamide, N, N-dimethylacetamide, dimethyl sulfoxide, and N-methylpyrrolidone, but also soluble in low-boiling solvents such as methanol and isopropanol. Moreover, the proton exchange membrane prepared from the ionic polymer containing a spiro structure exhibits excellent oxidative stability, as its mass and conductivity remain nearly unchanged when soaking in a 3 ppm $Fe^{2+}$, 3% $H_2O_2$ solution at 80° C. for over 4 hours. The results of the examples show that the PCPTPA membrane in Application example 2 has a higher water uptake and swelling ratio compared to the PTPA membrane with the terphenyl backbone without spiro unit. The chloride ion conductivity of PCPTPA membrane reaches 38 mS/cm, which is 19% higher than that of PTPA membrane (32 mS/cm). The maximum power density of MEA based on PCPTPA membrane is 1.05 W/cm², whereas the maximum power density of MEA based on PTPA membrane is 0.76 W/cm². The proton exchange membrane of Application example 6, where the counter ion is hydrogen ion, the hydrogen ion conductivity of SPFL membrane reaches 289 mS/cm, which is 38% higher than that of Nafion 212 membrane (209 mS/cm). The polymer containing a spiro structure in Example 7 exhibits excellent oxidative stability, and after soaking in Fenton's reagent for 8 hours, the conductivity and mass of the proton exchange membrane decrease by only 0.9% and 1.7%, respectively. In the Application example 8, the maximum power density of the proton exchange membrane with the counter ion of proton as the MEA reaches 1.09 W cm⁻². The gas permeability of the ionic membrane with a spiro structure prepared in Application example 6 is superior than that of Nafion.

DETAILED DESCRIPTION OF THE EMBODIMENTS

Figure 1:
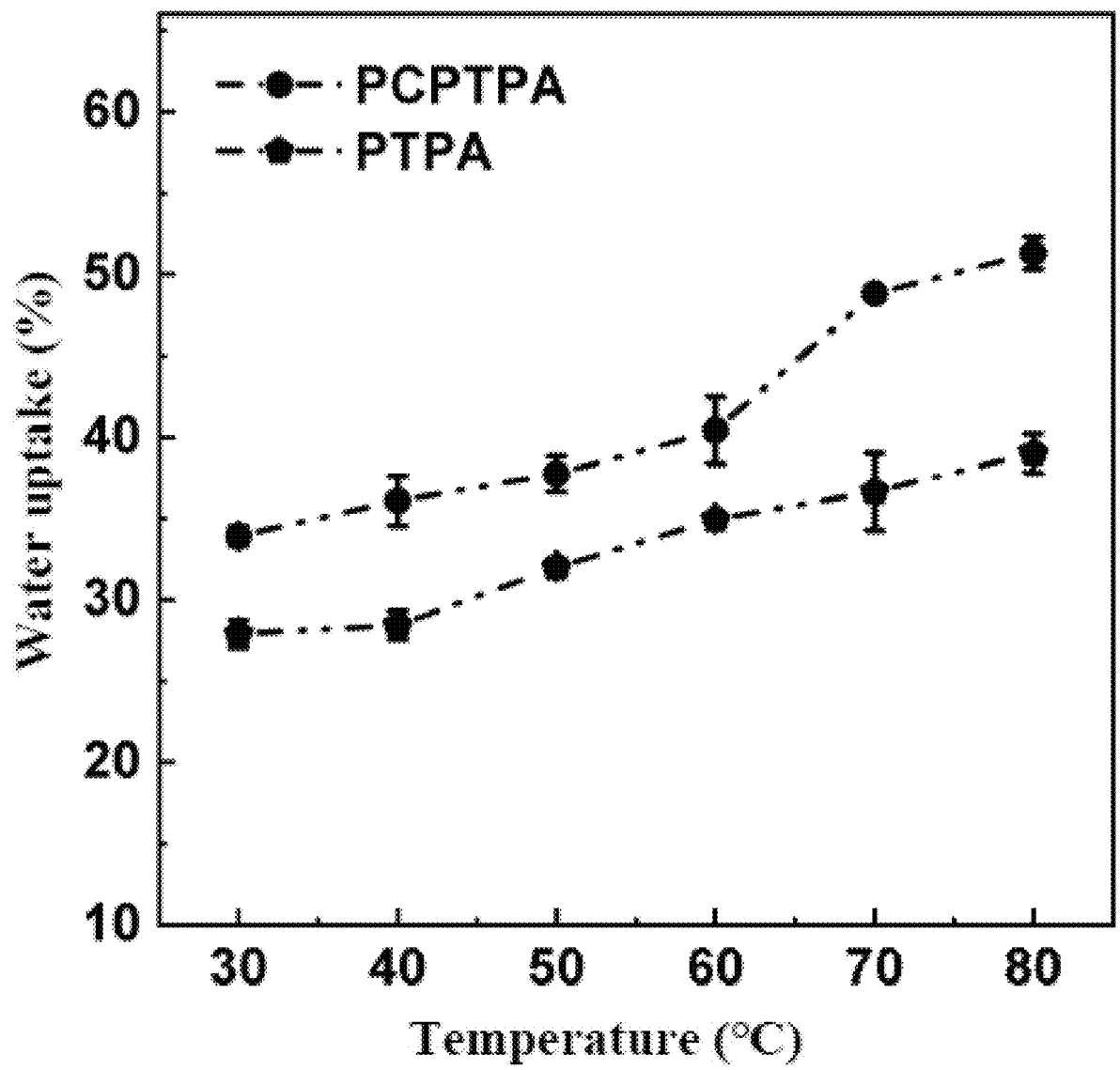
FIG. 1 is a graph of water uptake as a function of temperature for PCPTPA membrane of Application example 2 of the present invention and the PTPA membrane of Comparative example 1.

The present invention provides ionic polymers containing a spiro structure, having a structure as shown in Formula I:

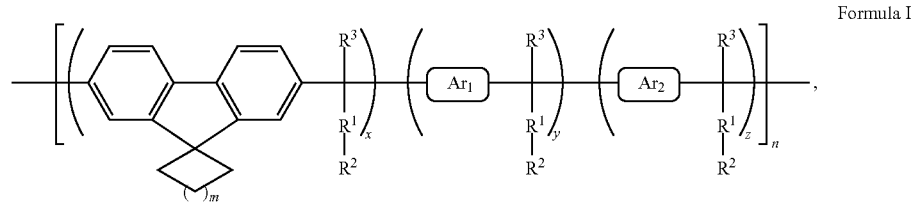

Formula I where m in Formula I determines the size of the spiro, and m is independently an integer between 2 and 4;

where x in Formula I is any number between 0.01 and 1.00, y and z are each independently any number between 0 and 0.99, x+y+z=1, and when z is 0, $R^2$ contains at least one anionic group or cationic group;

where n in Formula I represents the degree of polymerization, and n is an integer between 10 and 1,000,000;

where each $R^1$ in Formula I is independently selected from one or more of the following structures:

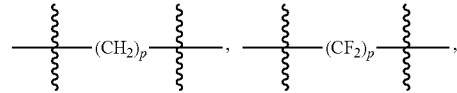

-continued

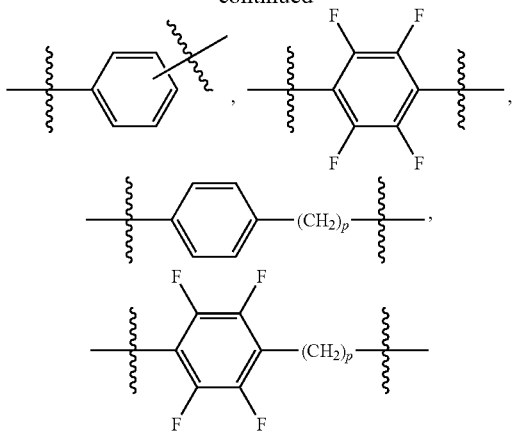

p being an integer between 1 and 15;

where each $R^2$ in Formula I is independently selected from a hydrogen atom or a cationic group, i.e. if a polymer of the structure shown in Formula I is a cationic polymer containing a spiro structure, and a counter ion is an anion; $R^2$ is selected from one or more of the following structures:

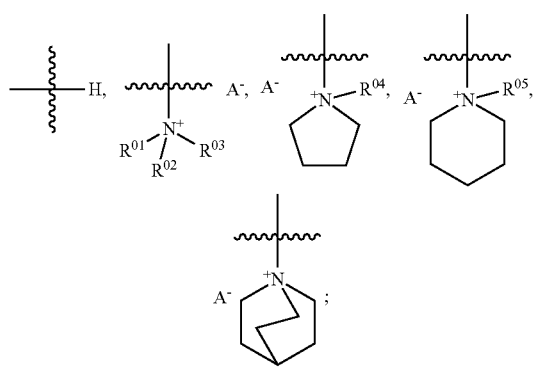

and when z=0, $R^2$ in x and y units cannot simultaneously be a hydrogen atom; $R^{01}$, $R^{02}$, $R^{03}$, $R^{04}$, and $R^{05}$ are each independently selected from a hydrocarbyl with the carbon atom number of 1 to 10; a counter anion $A^-$ is selected from a halide ion, a hydroxide ion, or a bicarbonate ion;

or where each $R^2$ in Formula I is independently selected from a hydrogen atom or a sulfonate ion, i.e.

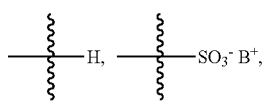

then the polymer of the structure shown in Formula I is an anionic polymer containing a spiro structure, and the counter ion is a cation; and when z=0, $R^2$ in the x and y units cannot simultaneously be a hydrogen atom; a counter ion $B^+$ is independently selected from a hydrogen ion, a sodium ion, or a potassium ion;

where each $R^3$ in Formula I is independently selected from one or more of the following structures:

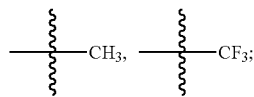

where each —$Ar_1$— fragment in Formula I is independently selected from one or more of the following structures:

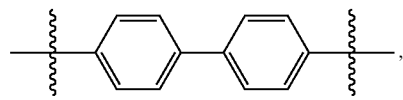
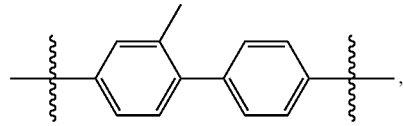
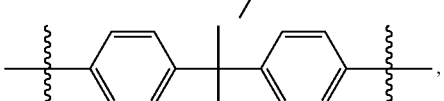
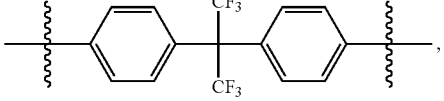
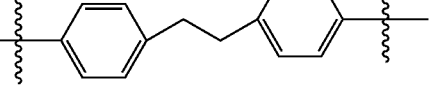
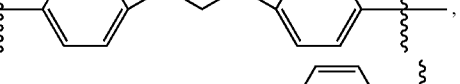
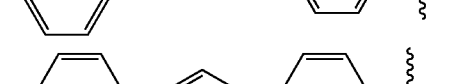
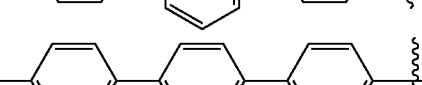
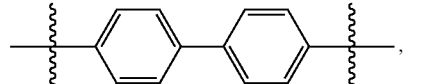
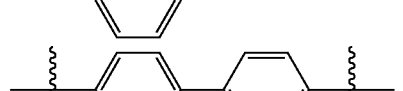
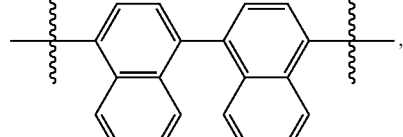

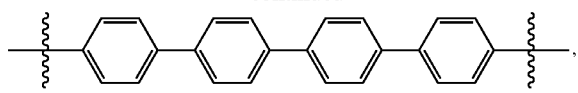
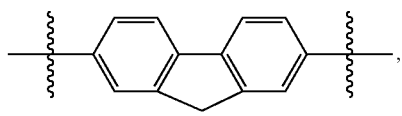
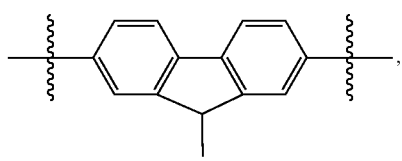
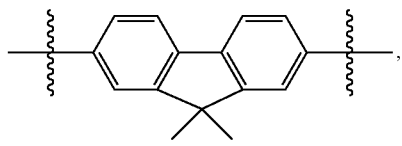
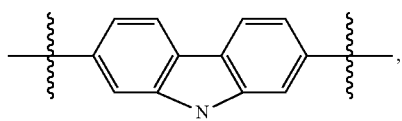
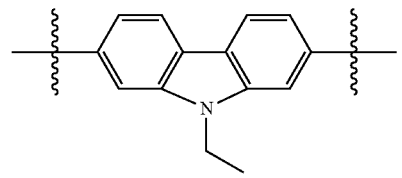
where each —Ar$_2$— fragment in Formula I is independently selected from one or more of the following structures:
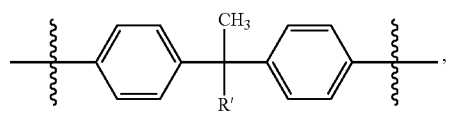
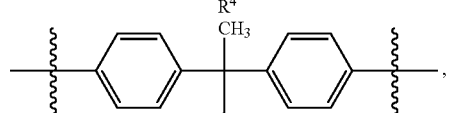
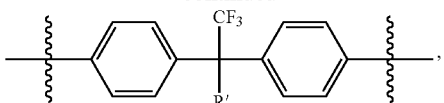
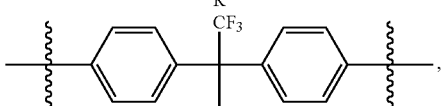
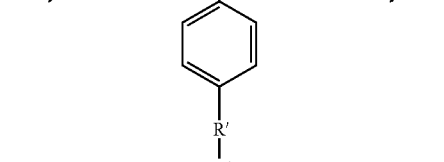
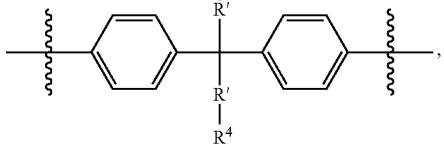
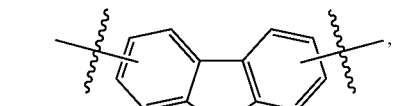
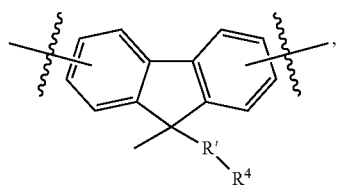
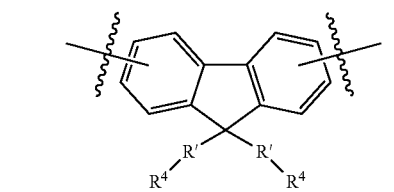

each R' being independently selected from an alkylene or an arylene group with the carbon atom number of 1 to 15; $R^4$ being a quaternary ammonium cation or sulfonate group, where if $R^4$ is the quaternary ammonium cation, $R^4$ has one or more of the following structures:

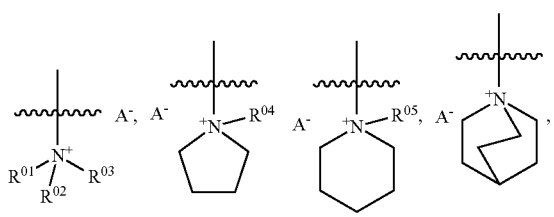

$R^{01}$, $R^{02}$, $R^{03}$, $R^{04}$, and $R^{05}$ being each independently selected from a hydrocarbyl with the carbon atom number of 1 to 10; a counter ion $A^-$ being selected from a halide ion, a hydroxide ion, or a bicarbonate ion;

the counter ion $B^+$ being selected from a hydrogen ion, a sodium ion, or a potassium ion if $R^4$ is the sulfonate ion, that is,

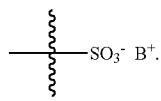

In the present invention, each —$Ar_1$— fragment in Formula I is preferably independently selected from one or more of the following structures,

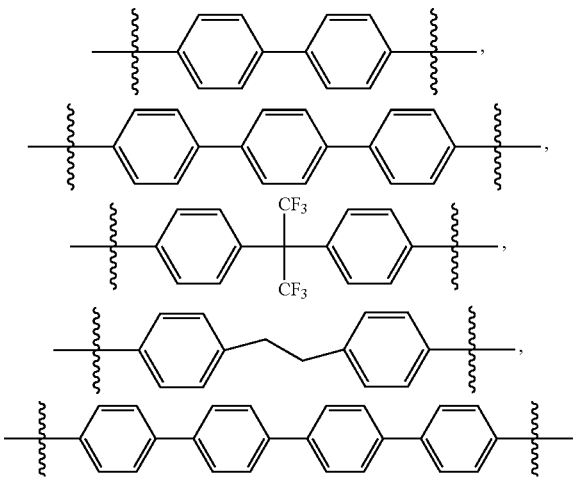

In the present invention, each —$Ar_2$— fragment in Formula I is preferably independently selected from one or more of the following structures:

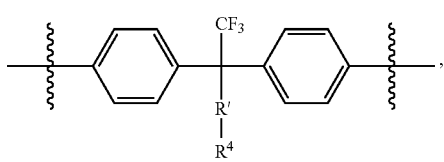

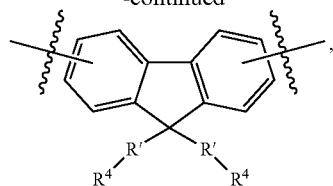

each R' being independently selected from an alkylene or an arylene group with the carbon atom number of 1 to 15; $R^4$ being an anionic group or a cationic group.

In the present invention, each $R^1$ in Formula I is preferably independently selected from one or more of the following structures:

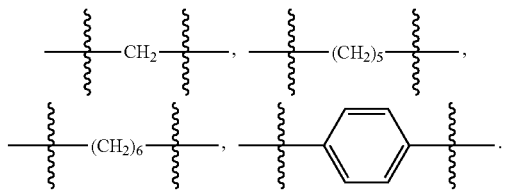

In the present invention, $R^2$ in Formula I is independently selected from the hydrogen atom or a cationic group, i.e. the cationic polymer containing the spiro structure, and the counter ion is the anion; $R^2$ is independently selected from

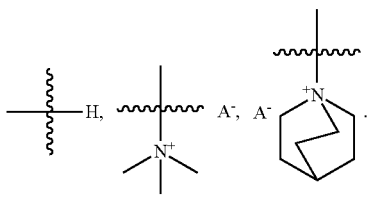

$R^2$ is independently selected from the hydrogen atom or the sulfonate ion,

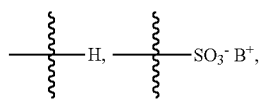

i.e. the anionic polymer containing the spiro structure, and the counter ion is the cation.

In the present invention, each $R^3$ in Formula I is preferably independently selected from one or more of the following structures:

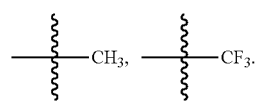

In the present invention, the ionic polymer containing a spiro structure preferably has one or more of the following structures:

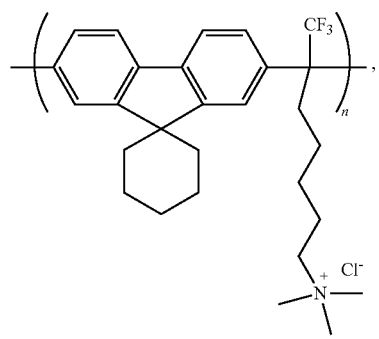
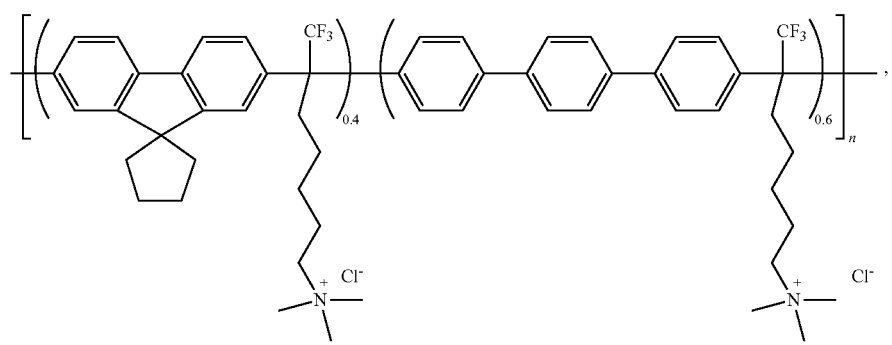
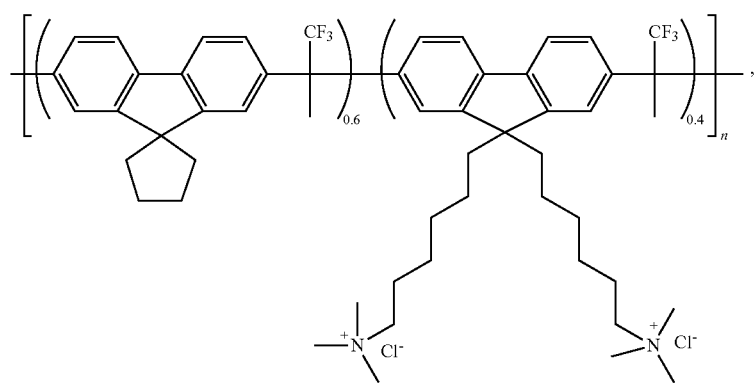
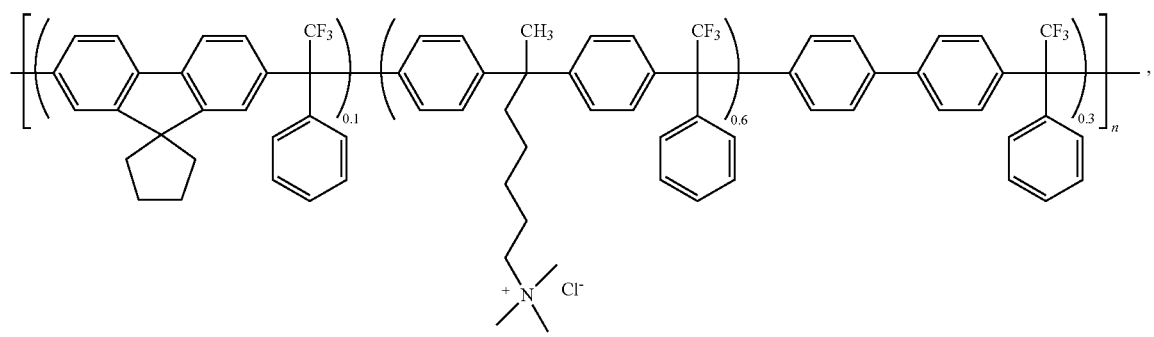

-continued
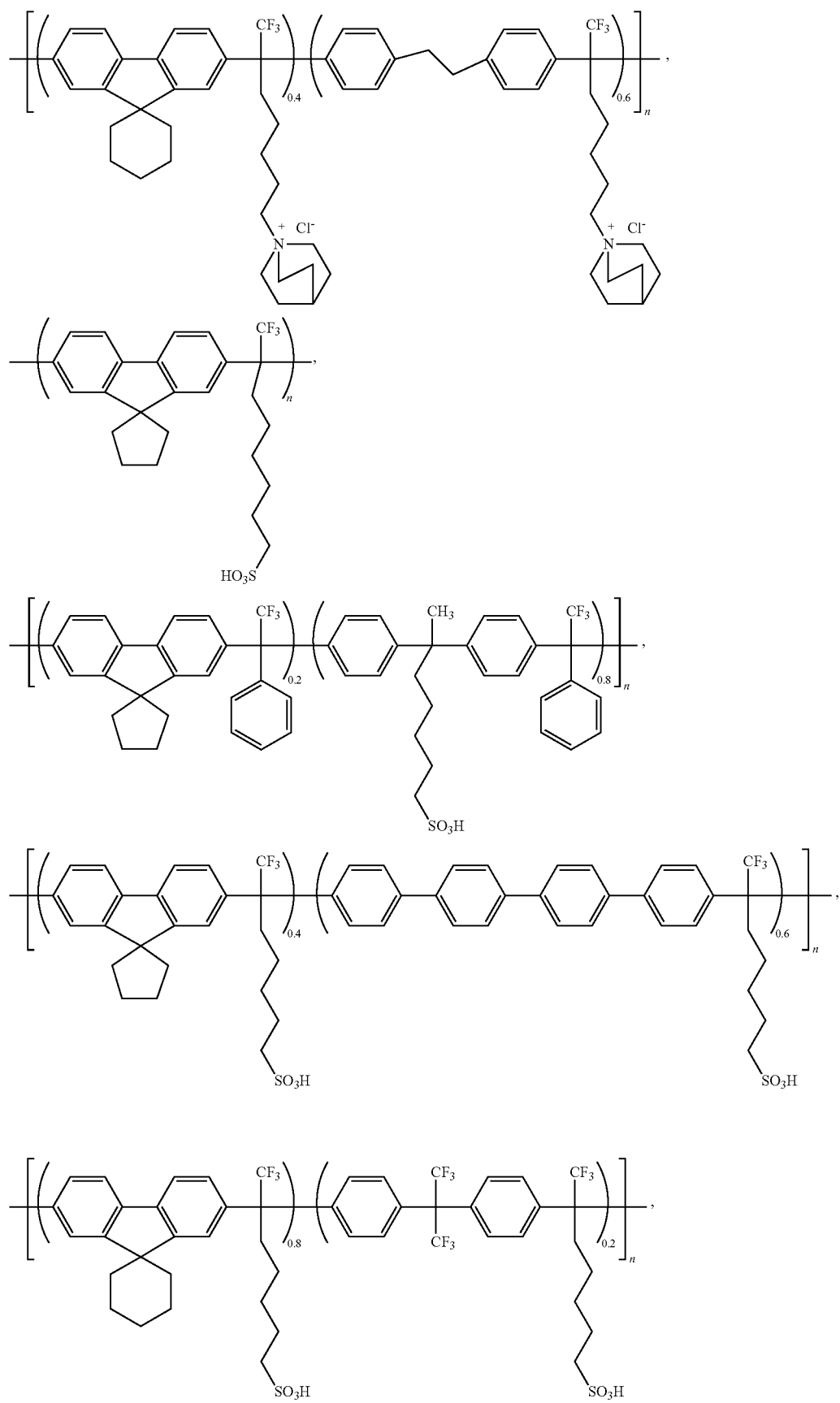

-continued

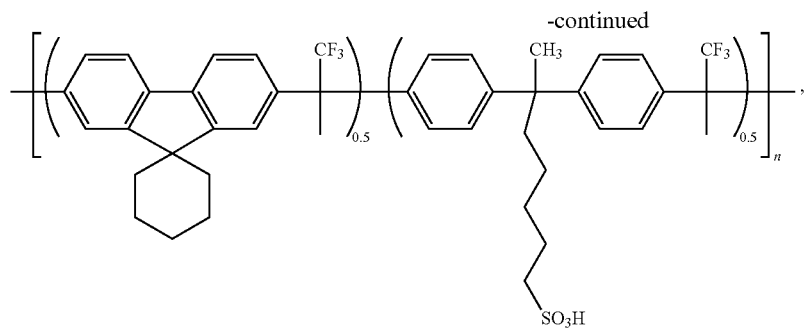

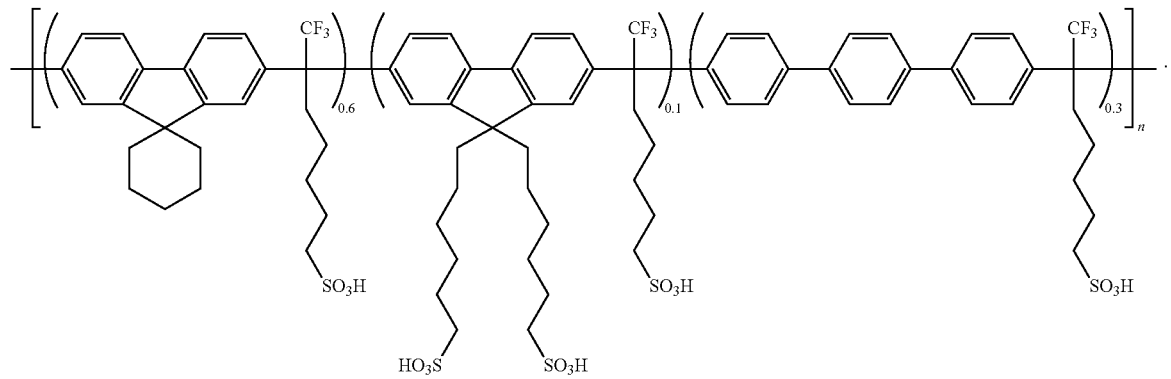

The present invention also provides a preparation method of the ionic polymer containing a spiro structure according to the above technical solution, when each $R^2$ in Formula I is independently selected from one or more of

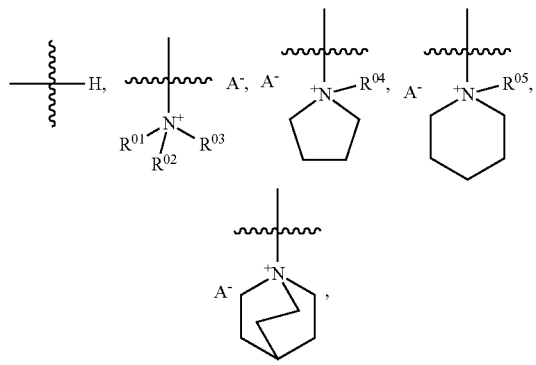

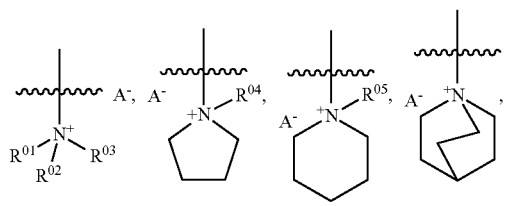

$R^4$ in Formula I is the quaternary ammonium cation, having one or more of the following structures:

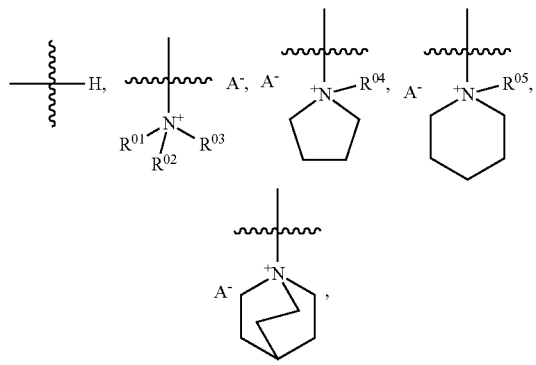

$R^{01}$, $R^{02}$, $R^{03}$, $R^{04}$, and $R^{05}$ being each independently selected from a hydrocarbyl with the carbon atom number of 1 to 10; a counter ion $A^-$ being selected from a halide ion, a hydroxide ion, or a bicarbonate ion;

the polymer of the structure shown in Formula I is a cationic polymer containing a spiro structure, and a preparation method of the cationic polymer containing the spiro structure includes the following steps:

mixing a halogen-terminated polymer precursor with the structure shown in Formula II, a first organic solvent, and a tertiary amine compound, and then carrying out a first substitution reaction to obtain the cationic polymer containing the spiro structure, Formula II

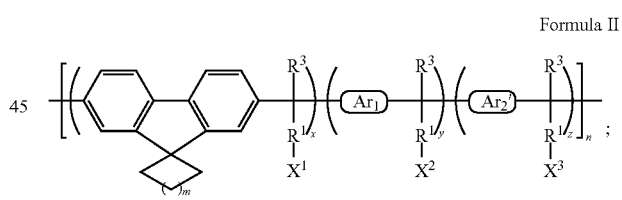

in Formula II, $X^1$, $X^2$, and $X^3$ being each independently selected from a halogen atom or a hydrogen atom, and when z=0, $X^1$ and $X^2$ being not hydrogen atoms at the same time;

in Formula II, $Ar_2'$ is an arylene unit tethering with halogen atoms, having one or more of the following structures:

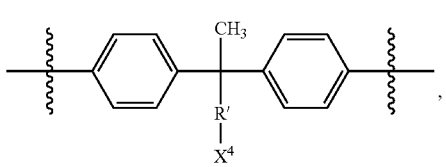

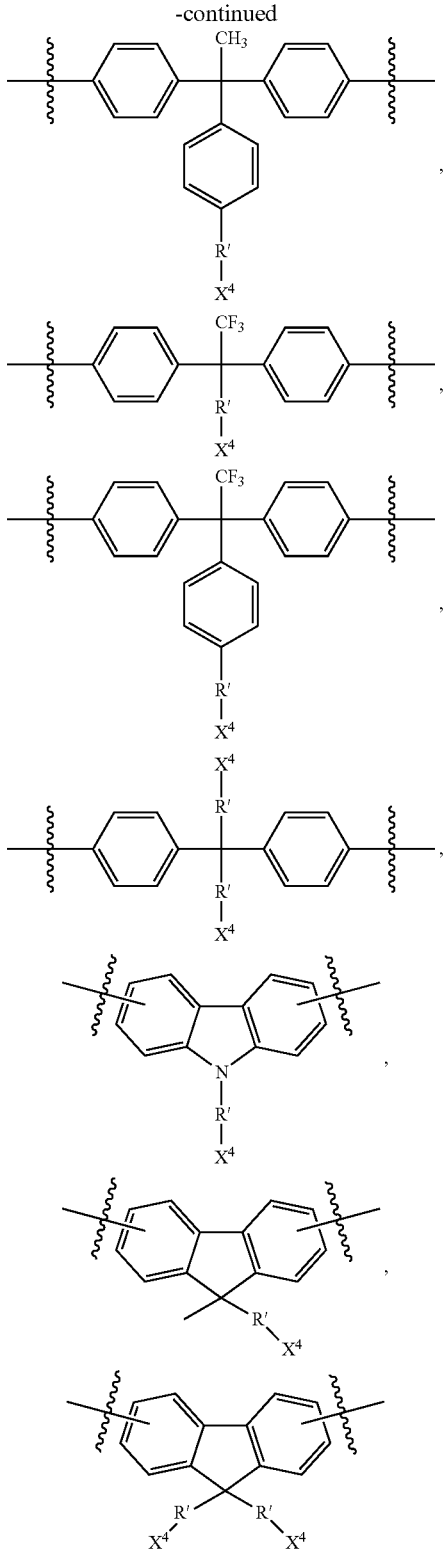

each R' being independently selected from an alkylene or an arylene group with the carbon atom number of 1 to 15, and $X^4$ being a halogen atom selected from one or more of Cl, Br, and I; and the tertiary amine compound being selected from one or more of

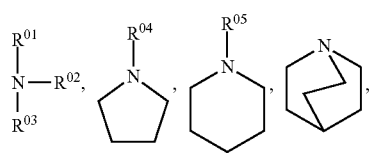

$R^{01}$, $R^{02}$, $R^{03}$, $R^{04}$, and $R^{05}$ being each independently selected from a hydrocarbyl with the carbon atom number of 1 to 10.

In the present invention, the tertiary amine compound being selected from one or more of

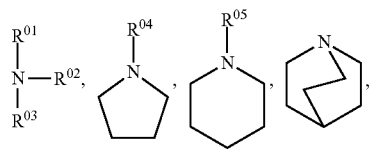

$R^{01}$, $R^{02}$, $R^{03}$, $R^{04}$, and $R^{05}$ being each independently selected from a hydrocarbyl with the carbon atom number of 1 to 10. In the present invention, the molar ratio of the amount of halogen end group in halogen-terminated polymer precursor to the amount of tertiary amine compound is between 1:1 and 1:10.

In the present invention, the first organic solvent is preferably a polar aprotic solvent, more preferably at least one of dimethylsulfoxide, N-methylpyrrolidone, N, N-dimethylformamide, and N, N-dimethylacetamide.

In the present invention, the temperature of the first substitution reaction is preferably 0 to 100° C., more preferably 20 to 80° C.; the time for the first substitution reaction is from 0.1 to 200 h, more preferably from 2 to 48 h.

After the first substitution reaction is completed, the present invention preferably combines the product of the first substitution reaction and a first precipitant, and then sequentially performs solid-liquid separation, washing and drying to obtain a cationic polymer containing a spiro structure.

In the present invention, the first precipitant is preferably at least one of water, acetone, diethyl ether, ethyl acetate, toluene, and petroleum ether. The operation of the solid-liquid separation, washing, and drying according to the present invention is not particularly limited and can be performed using techniques that are well known in the related field.

The present invention also provides a preparation method of the ionic polymer containing a spiro structure according to the above technical solution, when each $R^2$ in Formula I is independently selected from one or more of

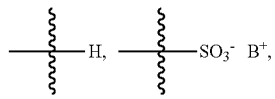

and $R^4$ is a sulfonate group,

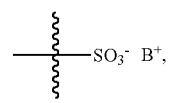

then the polymer of the structure shown in Formula I is an anionic polymer containing a spiro structure; the counter ion $B^+$ being selected from the hydrogen ion, the sodium ion, or the potassium ion; a preparation method of the anionic polymer containing the spiro structure includes the following steps:
(1) combining a halogen-terminated polymer precursor with the structure shown in Formula II with a second organic solvent and a thioacetate before carrying out a second substitution reaction to obtain a polymer precursor with a structure shown in Formula IV; the second substitution reaction is shown in Formula V:

Formula II

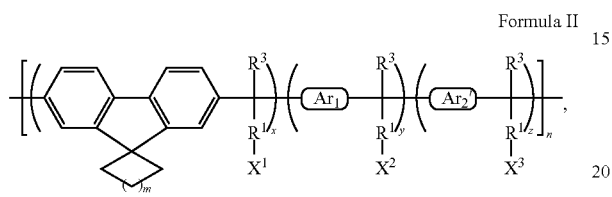

in Formula II, $X^1$, $X^2$, and $X^3$ being each independently selected from a halogen atom or a hydrogen atom, and when z=0, $X^1$ and $X^2$ being not hydrogen atoms at the same time;

in Formula II, $Ar_2'$ is an arylene unit tethering with halogen atoms, having one or more of the following structures:

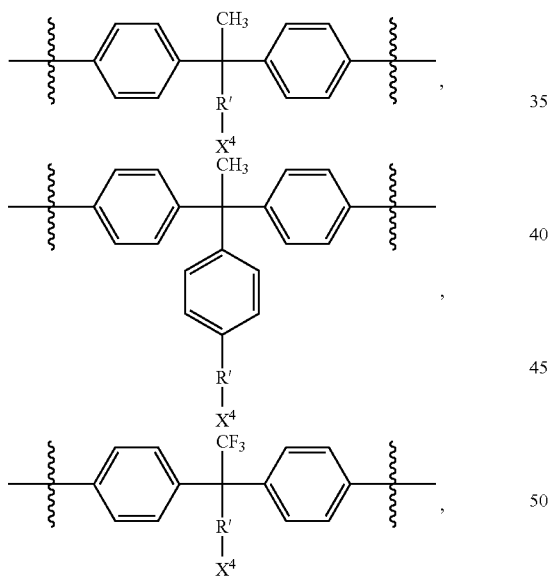

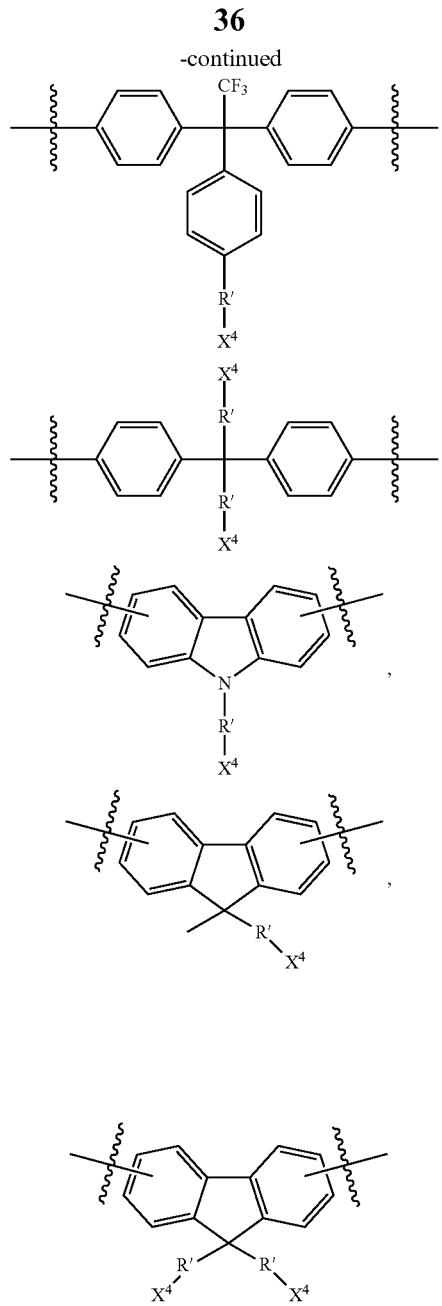

each R' being independently selected from an alkylene or an arylene group with the carbon atom number of 1 to 15, and $X^4$ being a halogen atom selected from one or more of Cl, Br, and I; and Formula V

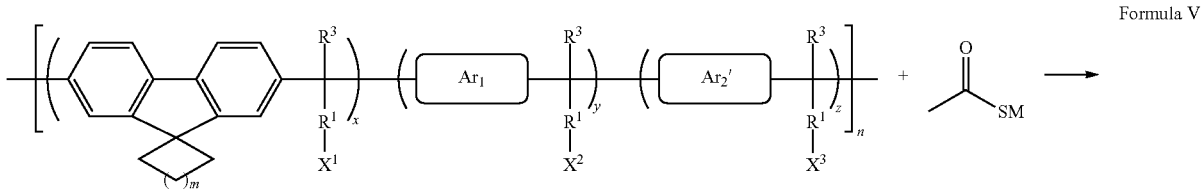

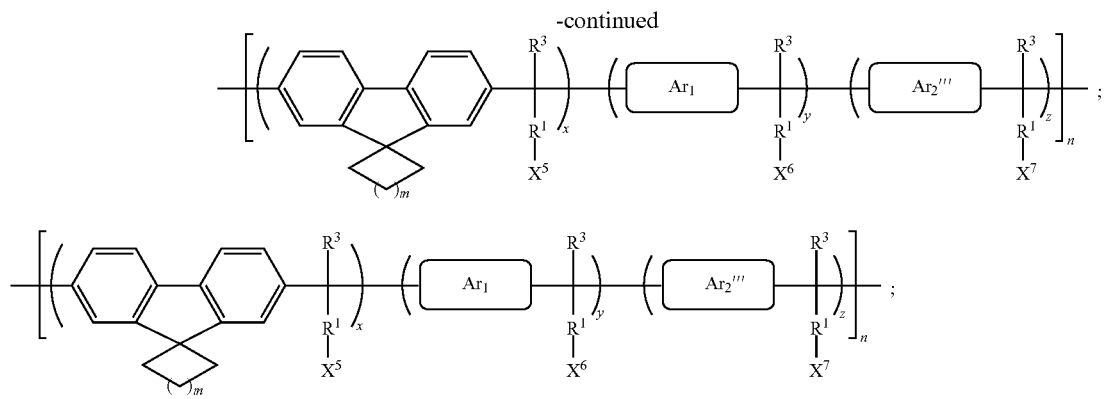

Formula IV in Formulas IV and V, $X^5$, $X^6$, and $X^7$ being each independently selected from the acetylthio group or hydrogen atom, and when z=0, $X^5$ and $X^6$ being not hydrogen atoms at the same time;

in Formulas IV and V, —$Ar_2'''$— being an arylene unit tethering with the acetylthio group, having one or more of the following structures:

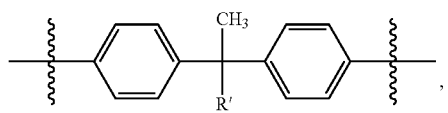

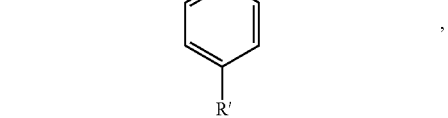

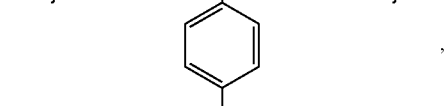

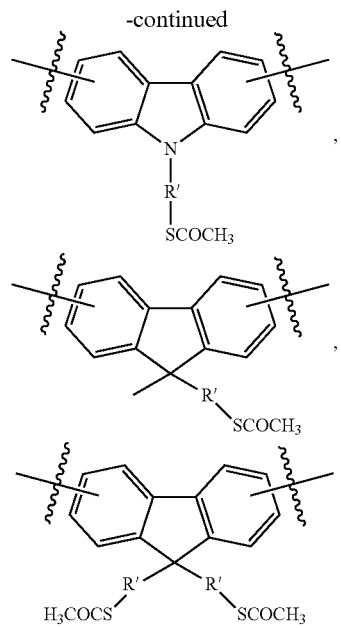

a structural formula of the thioacetate being

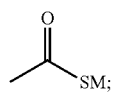

and
the thioacetate is selected from one or more

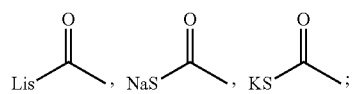

(2) performing an oxidation reaction after mixing the polymer precursor IV obtained in the step (1) with an oxidizing reagent, to obtain the anionic polymer containing the spiro structure, the oxidizing reagent being selected from one or more of a carboxylic acid solution containing hydrogen peroxide or a peroxyacid oxidant, and the peroxyacid oxidant being one or more of

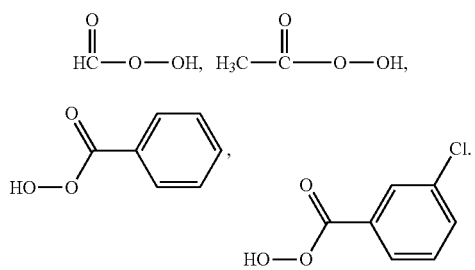

In the present invention, the molar ratio of the amount of halogen end group in halogen-terminated polymer precursor to the amount of thioacetate compounds is between 1:1 and 1:10.

In the present invention, the second organic solvent is preferably a polar aprotic solvent, more preferably at least one of dimethylsulfoxide, N-methylpyrrolidone, N, N-dimethylformamide, and N, N-dimethylacetamide.

In the present invention, the temperature of the second substitution reaction is preferably 0 to 100° C., more preferably 0 to 60° C.; the time for the second substitution reaction is preferably from 1 to 100 h, more preferably from 4 to 24 h, further preferably from 5 to 16 h.

In the present invention, the molar ratio of the amount of acetylthio group in the precursor represented by Formula IV to the amount of oxidizing reagent is between 1:1 and 1:10.

In the present invention, the temperature of the oxidation reaction is preferably 0 to 100° C., more preferably 0 to 50° C.; the time of the oxidation reaction is preferably 0 to 100 h, more preferably 5 to 48 h, further preferably 8 to 20 h.

After the oxidation reaction is completed, the present invention preferably combines the product of the oxidation reaction with a second precipitant, and then sequentially performs solid-liquid separation, washing, and drying to obtain an anionic polymer containing a spiro structure.

In the present invention, the second precipitant is preferably at least one of water, acetone, diethyl ether, ethyl acetate, toluene, and petroleum ether. The operation of the solid-liquid separation, washing, and drying according to the present invention is not particularly limited and can be performed using techniques that are well known in the related field.

In the present invention, the halogen-terminated polymer precursor with the structure shown in Formula II in the present invention preferably includes the following steps:

performing a polycondensation reaction after mixing spiro-containing aromatic compound, $Ar_1'$, $Ar_2''$, ketone monomer, and third organic solvent and organic strong acid, to obtain the halogen-terminated polymer precursor with the structure shown in Formula II, where the polycondensation reaction is shown in Formula III,

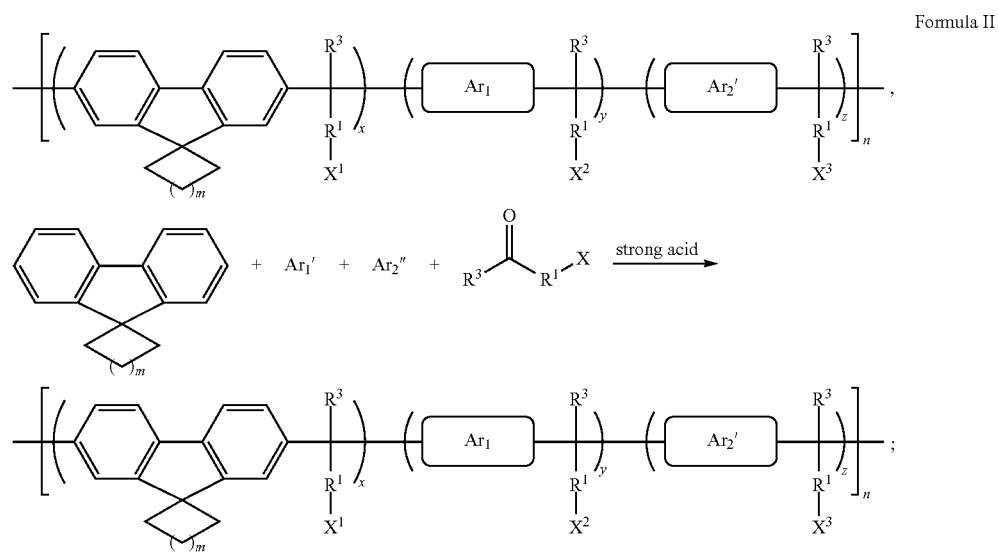

Formula II in Formula III, when the amount of $Ar_1'$ as a raw material is zero, y=0; when the amount of $Ar_2''$ as a raw material is zero, z=0;
in Formula III, X is independently selected from a halogen atom or a hydrogen atom, $X^1$, $X^2$, and $X^3$ are each independently selected from a halogen atom or a hydrogen atom, and when z=0, $X^1$ and $X^2$ are not hydrogen atoms at the same time;
the spiro-containing aromatic compound has one or more of the following structures:

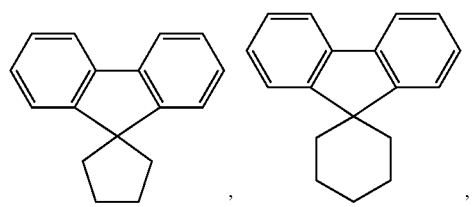

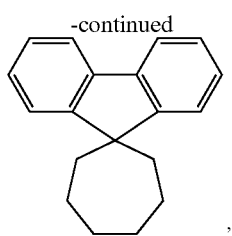
a structure of the ketone monomer is
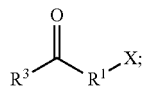
$Ar_1'$ is an aromatic compound having one or more of the following structures:
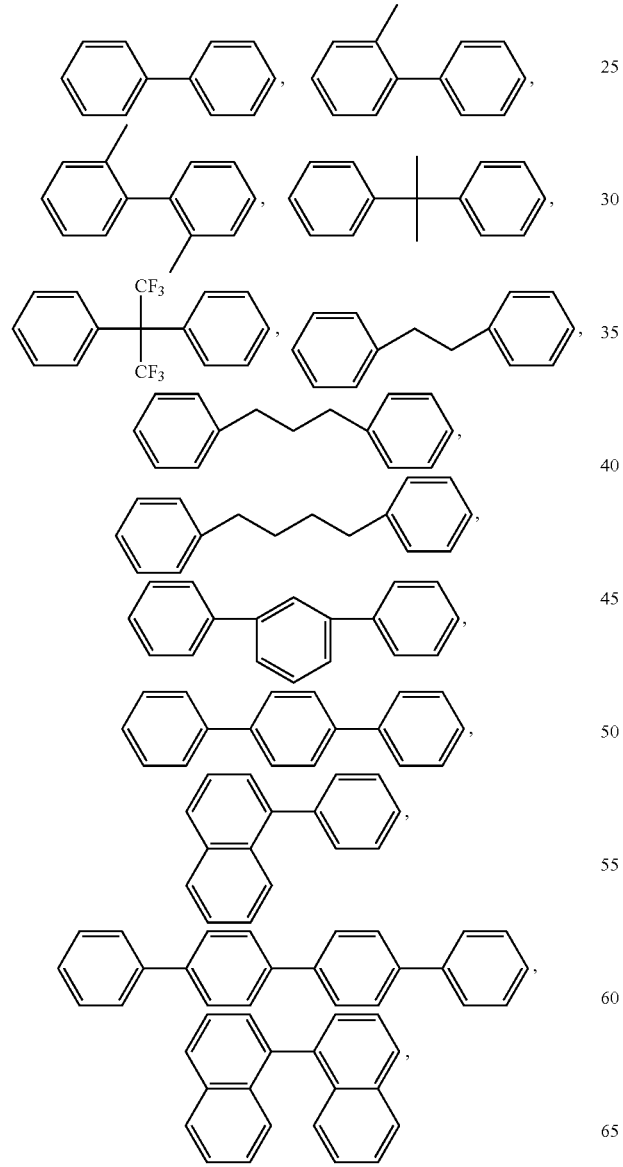
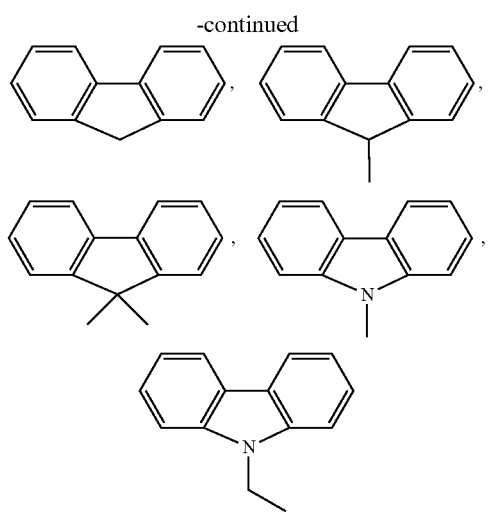
$Ar_2''$ is an aromatic compound tethering with halogen group, having one or more of the following structures:
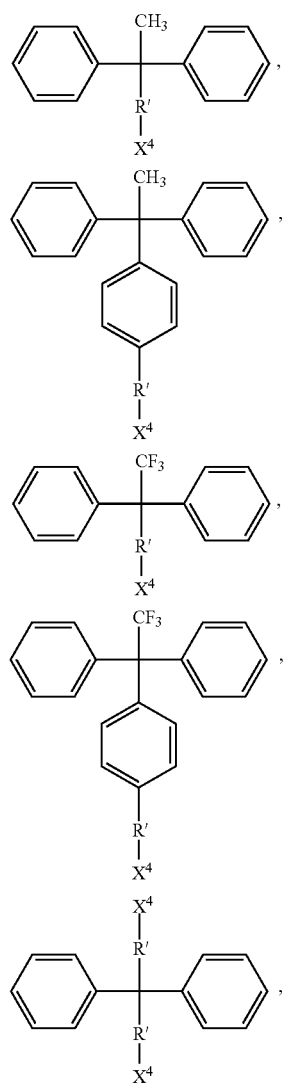

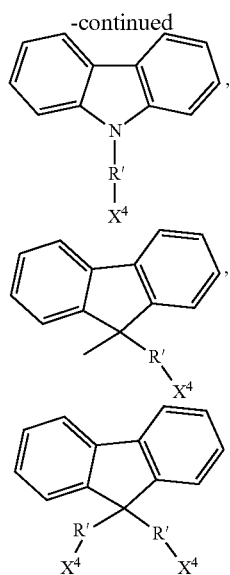

each R' being independently selected from an alkylene or an arylene group with the carbon atom number of 1 to 15, and $X^4$ being a halogen atom selected from one or more of Cl, Br, and I.

The strong organic acid is at least one of methanesulfonic acid, trifluoromethanesulfonic acid, and trifluoroacetic acid.

In the present invention, the molar ratio of the ketone monomer to the strong organic acid is preferably between 1:1 and 1:20.

In the present invention, the third organic solvent is preferably at least one of dichloromethane, chloroform, carbon tetrachloride, dichloroethane, nitromethane, and nitrobenzene.

In the present invention, the temperature of the polycondensation reaction is preferably −20 to 100° C., more preferably 0 to 30° C.; the polycondensation reaction time is preferably 0.1 to 100 h, more preferably 0.5 to 48 h.

After the polycondensation reaction is completed, the present invention preferably combines the product of the polycondensation reaction with a third precipitant, and then sequentially performs solid-liquid separation, washing and drying to obtain a halogen-terminated polymer precursor with the structure shown in Formula II.

In the present invention, the third precipitant is preferably at least one of water, methanol, ethanol, acetone, diethyl ether, and ethyl acetate. The operation of the solid-liquid separation, washing, and drying according to the present invention is not particularly limited and can be performed using techniques that are well known in the related field.

The preparation method of the ionic polymer containing a spiro structure provided by the present invention is simple and easy process, and suitable for large-scale production.

The present invention also provides the application of the ionic polymer containing a spiro structure according to the above technical solution as a binder for the catalyst layer of a PEMFC or an AEMFC.

In the present invention, before using the ionic polymer containing a spiro structure as a catalyst binder for a PEMFC or an AEMFC, it is preferable to convert the counter ion of the ionic polymer containing a spiro structure into another kind of counter ion as needed.

In the present invention, the method of converting the counter ion of the ionic polymer containing a spiro structure into another kind of counter ion according to necessity, preferably includes the following steps: the ionic polymer containing a spiro structure is soaked into a solution containing other kinds of counter ions and then washed with deionized water thoroughly to obtain an ionic polymer containing a spiro structure with other kinds of counter ions.

In the present invention, when the counter ion in the ionic polymer containing a spiro structure is an anion, the counter ion of the other kind is preferably at least one of hydroxide ion, carbonate ion, bicarbonate ion, sulfate ion, other halide ion different from $A^-$; the solution containing other kinds of counter ions is preferably one of $Na_2SO_4$ solution, NaOH solution, NaCl solution, $Na_2CO_3$ solution, $K_2CO_3$ solution, $NaHCO_3$ solution, and $KHCO_3$ solution.

In the present invention, when the counter ion in the ionic polymer containing a spiro structure is a cation, the counter ion of the other kind is preferably at least one of hydrogen ion, sodium ion, potassium ion; the solution containing other kinds of counter ions is preferably one of $H_2SO_4$ solution, HCl solution, $Na_2CO_3$ solution, $K_2CO_3$ solution, $NaHCO_3$ solution, and $KHCO_3$ solution.

In the present invention, the concentration of the solution containing other kinds of counter ions is preferably 0.01 to 10 mol/L.

In the present invention, the soaking time is preferably 12 to 48 h; the temperature of the soaking is preferably from 30 to 50° C.

In the present invention, the application of the ionic polymer containing a spiro structure as a catalyst binder for a PEMFC or an AEMFC for preparing a slurry of a catalyst binder containing a spiro structure, preferably includes the following steps: dissolving or dispersing the ionic polymer containing a spiro structure in an organic solvent to obtain a solution or dispersion of a catalyst binder; the catalyst binder solution or dispersion is then mixed uniformly with the catalyst to obtain a slurry containing the catalyst binder.

In the present invention, the organic solvent is preferably a low boiling point organic solvent, more preferably at least one of methanol, isopropanol, and ethanol. In the present invention, the concentration of the ionic polymer containing a spiro structure in the slurry of the catalyst binder having a spiro structure is 0.5 to 80 wt. %.

The present invention also provides the application of the ionic polymer containing a spiro structure according to the above technical solution for preparing a proton exchange membrane or an anion exchange membrane.

In the present invention, the preparation method of a proton exchange membrane or an anion exchange membrane using the ionic polymer containing a spiro structure preferably includes the following steps:
  dissolving or dispersing the ionic polymer containing a spiro structure in a fifth organic solvent to acquire a solution or dispersion of the polymer;
  coating the solution or dispersion of the polymer on a substrate and then removing the solvent to obtain the proton exchange membrane or the anion exchange membrane; and In the present invention, the fifth organic solvent is preferably a polar aprotic solvent, more preferably at least one of dimethylsulfoxide, N-methylpyrrolidone, N, N-dimethylformamide, and N, N-dimethylacetamide. In the present invention, the substrate is selected from a glass plate, a Teflon plate, or a reinforcing fabric. In the present invention, the method of coating membrane is preferably solution casting membrane, spin coating membrane, wiped membrane, casting, or dipping membrane. In the present invention, the method for removing the solvent is preferably evaporation at room temperature or drying by heating at 30 to 100° C.

In the present invention, the method of converting the counter ion in the proton exchange membrane or anion exchange membrane into other kinds of counter ion according to need preferably includes the following steps: the proton exchange membrane or anion exchange membrane is soaked in a solution containing other kinds of counter ions, and then washed with deionized water thoroughly to obtain a proton exchange membrane or anion exchange membrane containing other kinds of counter ions.

In the present invention, when the counter ion in the anion exchange membrane is an anion, the counter ion is preferably at least one of hydroxide ion, carbonate ion, bicarbonate ion, sulfate ion, other halide ion different from $A^-$; the solution containing other kinds of counter ions is preferably one of $Na_2SO_4$ solution, NaCl solution, $Na_2CO_3$ solution, $K_2CO_3$ solution, $NaHCO_3$ solution, and $KHCO_3$ solution.

In the present invention, when the counter ion in the proton exchange membrane is a cation, the counter ion is preferably at least one of the hydrogen ion, sodium ion, or potassium ion; the solution containing other kinds of counter ions is preferably one of $H_2SO_4$ solution, HCl solution, $Na_2CO_3$ solution, $K_2CO_3$ solution, $NaHCO_3$ solution, and $KHCO_3$ solution.

In the present invention, the solution containing other kinds of counter ions is preferably 0.01 to 10 mol/L.

In the present invention, the soaking time is preferably 12 to 48 h; the temperature of the soaking is preferably from 30 to 60° C.

The present invention will now be described more detailed hereinafter concerning examples thereof. It is to be understood that the described embodiments are only a few, but not all embodiments of the present invention. Based on the embodiments of the present invention, all other embodiments obtained by a person of ordinary skill in the art without inventive effort fall within the scope of the present invention.

Example 1

An ionic polymer containing a spiro structure has a structure represented by Formula (1-1):

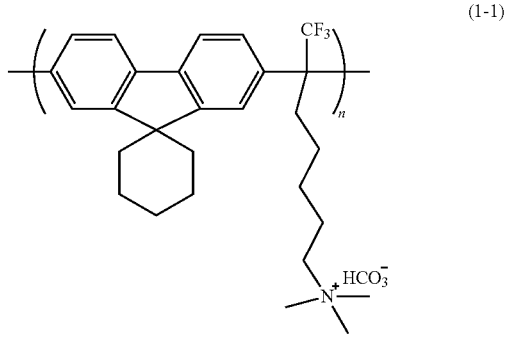

(1-1)

The preparation method of the ionic polymer containing a spiro structure is as follows: spiro (cyclohexane-1,9'-fluorene) (0.50 g, 2.135 mmol), 7-bromo-1,1,1-trifluoroheptan-2-one (0.53 g, 2.135 mmol), dichloromethane (2.0 mL), and trifluoromethanesulfonic acid (2.0 mL) were subjected to a polycondensation reaction at room temperature for 12 h to obtain a viscous polymer solution. After the polycondensation reaction was complete, the product was slowly added dropwise to a mixed solvent of ethanol and water (1:1) to obtain a white fibrous polymer, which was then filtered, thoroughly washed, and dried. 0.86 g of a white fibrous bromo-terminated polymer was obtained.

Then, the above bromo-terminated polymer was dissolved in 15 mL of N-methylpyrrolidone, 2.6 mL of trimethylamine in ethanol (4.2 mol/L) was added, and after the first substitution reaction was carried out at room temperature for 48 hours, the product of the first substitution reaction was slowly added to anhydrous diethyl ether, filtered, and dried to obtain 0.82 g of an off-white fibrous (at which time the counter ion is bromide ion) cationic polymer containing a spiro structure.

Application Example 1

The counter ions of the ionic polymer containing a spiro structure prepared in Example 1 were exchanged into $HCO_3^-$ by ion exchange as the following procedure: soaking the ionic polymer containing a spiro structure in a 2 mol/L $NaHCO_3$ solution for 48 h, and then washing with deionized water thoroughly to obtain an ionic polymer containing a spiro structure with a counter ion of $HCO_3^-$ as a catalyst binder.

The ionic polymer containing a spiro structure prepared in Example 1 was dissolved in 10 mL of dimethyl sulfoxide to obtain a polymer solution. After filtration, the solution was coated on a clean glass plate by a solution casting method, and the glass plate was placed in a thermoventilated oven at 80° C. to dry for 24 h to evaporate the solvent. Once the temperature was cooled to room temperature, the glass plate was taken out, and the membrane was removed after soaking in deionized water. After thorough washing with deionized water, an anion exchange membrane with a counter ion of $Br^-$ was obtained.

The anion exchange membrane in which the counter ion prepared above is $Br^-$ can be exchanged into $Cl^-$ by ion exchange as needed, and the steps are as follows: immersing the anion exchange membrane with the counter ion of $Br^-$ in a 2 mol/L NaCl solution for 48 h, and then thoroughly washing with deionized water to obtain an anion exchange membrane in $Cl^-$ form.

Example 2

An ionic polymer containing a spiro structure has a structure represented by Formula (1-2):

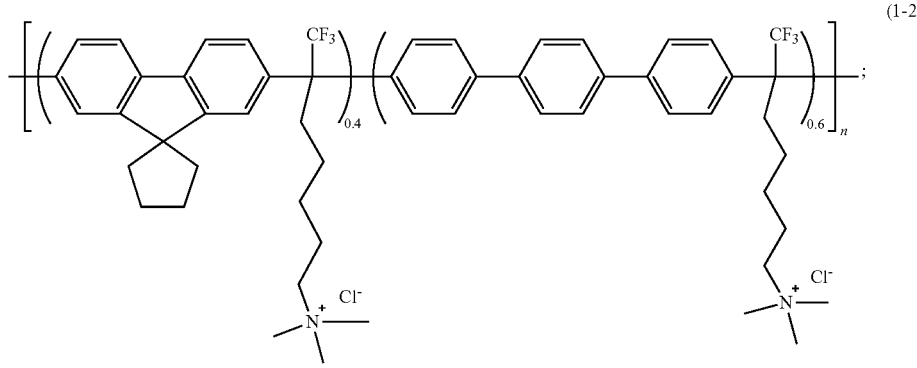

(1-2)

The preparation method of the ionic polymer containing a spiro structure is as follows: spiro (cyclopentane-1,9'-fluorene) (0.22 g, 0.924 mmol), p-terphenyl (0.26 g, 1.129 mmol), 7-bromo-1,1,1-trifluoroheptan-2-one (0.61 g, 2.460 mmol), dichloromethane (1.0 mL) and trifluoromethanesulfonic acid (2.2 mL) were subjected to a polycondensation reaction at room temperature for 10 h to produce a viscous polymer solution. Once the polycondensation reaction was complete, the product was slowly added dropwise to a mixed solvent of ethanol and water (1:1). A white fibrous polymer was filtered, and dried to obtain 0.98 g of bromo-terminated polymer.

Then, the aforementioned bromo-terminated polymer was dissolved in 15 mL of N-methylpyrrolidone, 2.7 mL of trimethylamine in ethanol (4.2 mol/L) was added. After the first substitution reaction was carried out at room temperature for 48 hours, the reaction solution was added to anhydrous diethyl ether, filtered, and dried to obtain 1.02 g of an off-white fibrous cationic polymer containing a spiro structure.

Application Example 2

The ionic polymer containing a spiro structure prepared in Example 2 was dissolved in 11 mL of dimethyl sulfoxide to produce a polymer solution. After filtration, the solution was coated on a clean glass plate by a solution casting method. The glass plate was placed in a thermoventilated oven at 80° C. for 24 h to evaporate the solvent. After the temperature was cooled to room temperature, the glass plate was taken out and placed in deionized water to remove a membrane, and after thorough washing with deionized water, an anion exchange membrane with a counter ion of Br$^-$ was obtained.

The anion exchange membrane in which the counter ion prepared above is Br$^-$ can be exchanged into Cl$^-$ by ion exchange as needed, and the steps are as follows: immersing the anion exchange membrane with the counter ion of Br$^-$ in a 2 mol/L NaCl solution for 48 h, and then thoroughly washing with deionized water to obtain an anion exchange membrane with the counter ion of Cl$^-$.

Example 3

An ionic polymer containing a spiro structure has a structural formula represented by Formula (1-3):

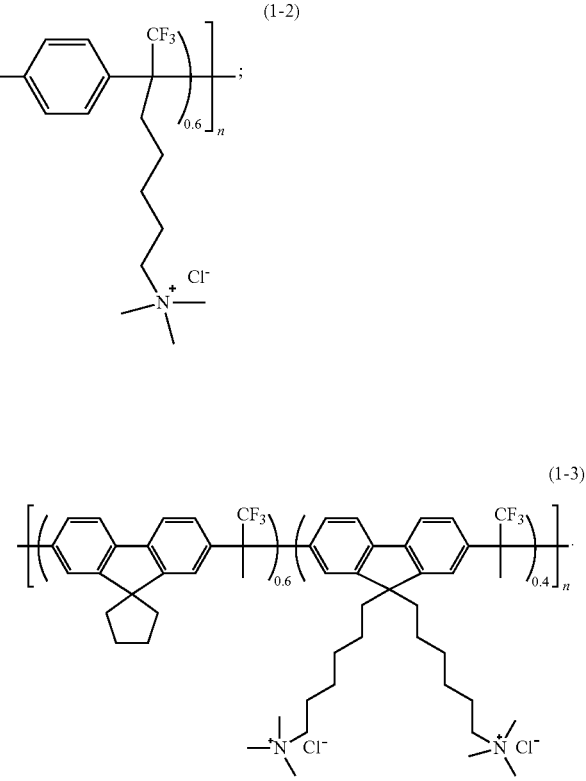

(1-3)

The preparation method of the ionic polymer containing a spiro structure is as follows: spiro (cyclopentane-1,9'-fluorene) (0.16 g, 0.677 mmol), 9,9-bis (6-bromohexyl)-9H-fluorene (0.22 g, 0.4514 mmol), trifluoroacetone (0.21 g, 1.862 mmol), dichloromethane (5.0 mL) and trifluoromethanesulfonic acid (5.0 mL) were subjected to a polycondensation reaction at room temperature for 48 h to obtain a viscous polymer solution. After the reaction was complete, the product was slowly added dropwise to a mixed solvent of methanol and water (1:1) to obtain a white fibrous polymer. The white fibrous polymer was filtered and dried to obtain 0.51 g of bromo-terminated polymer.

Then, the above bromo-terminated polymer was dissolved in 13 mL of N-methylpyrrolidone, 1.8 mL of trimethylamine in ethanol (4.2 mol/L) was added, and after the first substitution reaction was carried out at room temperature for 48 hours, the reaction solution was added to ethyl acetate, filtered, and dried to obtain 0.52 g of an off-white fibrous cationic polymer containing a spiro structure.

Application Example 3

According to the method of Application example 1, the counter ion of the ionic polymer containing a spiro structure prepared in Example 3 is subjected to ion exchange as needed to obtain an ionic polymer containing a spiro structure having a counter ion Cl$^-$ as a catalyst binder.

According to the method of Application example 2, using the ionic polymer containing a spiro structure prepared in Example 3 to prepare an anion exchange membrane with a counter ion of Br⁻; the difference from Application example 2 was the application of 8 mL of dimethyl sulfoxide.

According to the method of Application example 2, the anions in the above-prepared anion exchange membrane with the counter ion of Br⁻ are subjected to ion exchange as needed to obtain an anion exchange membrane with the counter ion of Cl⁻.

Example 4

An ionic polymer containing a spiro structure has a structural formula represented by Formula (1-4):

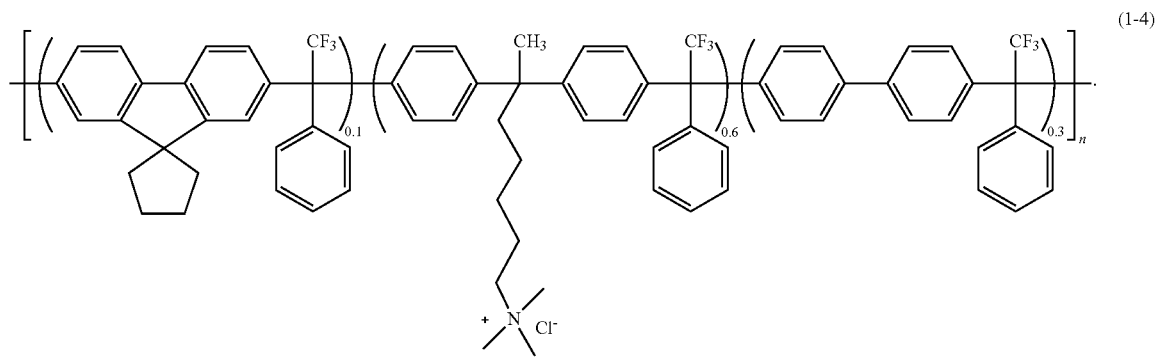

The preparation method of the ionic polymer containing a spiro structure is as follows: spiro (cyclopentane-1,9'-fluorene) (0.16 g, 0.677 mmol), 7,7,7-trifluoro-6,6-diphenyl-1-bromoheptane (1.34 g, 4.062 mmol), biphenyl (0.28 g, 2.031 mmol), 2,2,2-trifluoroacetophenone (1.29 g, 7.448 mmol), dichloromethane (10.0 mL) and trifluoromethanesulfonic acid (10.0 mL) were reacted at room temperature for 48 h to obtain a viscous polymer solution. The product of the polycondensation reaction was added dropwise to a mixed solvent (1:1) of methanol and water to obtain a white fibrous polymer. The white fibrous polymer was filtered and dried to obtain 2.06 g of a bromo-terminated polymer.

Then, the above bromo-terminated polymer was dissolved in 50 mL of N-methylpyrrolidone, 10.4 mL of trimethylamine in ethanol (4.2 mol/L) was added, and after the first substitution reaction at room temperature for 48 hours, the reaction solution was added to ethyl acetate, filtered, and dried to obtain 2.04 g of an off-white fibrous cationic polymer containing a spiro structure.

Application Example 4

According to the method of Application example 2, using the ionic polymer containing a spiro structure prepared in Example 4 to prepare an anion exchange membrane with a counter ion of Br⁻; the difference from Application example 2 was the application of 27 mL of dimethyl sulfoxide.

According to the method of Application example 2, the anions in the above-prepared anion exchange membrane with the counter ion of Br⁻ are subjected to ion exchange as needed to obtain an anion exchange membrane with the counter ion of Cl⁻.

Example 5

An ionic polymer containing a spiro structure has a structural formula represented by Formula (1-5):

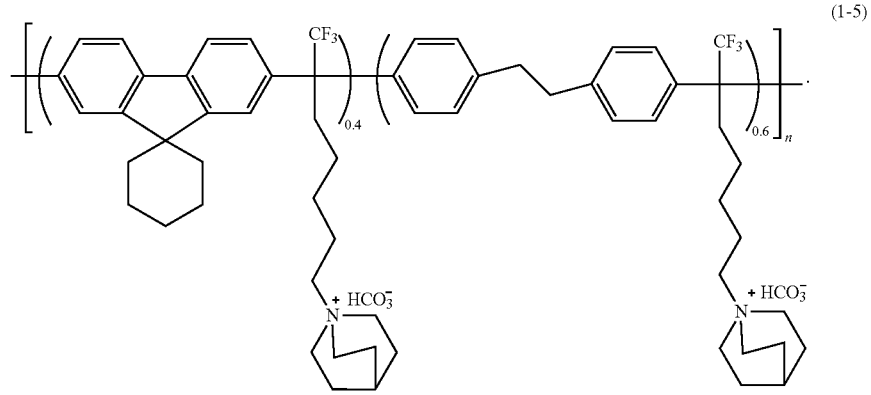

The preparation method of the ionic polymer containing a spiro structure is as follows: spiro (cyclohexane-1,9'-fluorene) (0.36 g, 1.544 mmol), bibenzyl (0.42 g, 2.316 mmol), 7-bromo-1,1,1-trifluoroheptan-2-one (1.94 g, 7.864 mmol), dichloromethane (7.0 mL) and trifluoromethanesulfonic acid (7.0 mL) were reacted at room temperature for 48 h to obtain a viscous polymer solution. After the reaction was complete, it was added dropwise to water to obtain a white fibrous polymer, which was filtered and dried to obtain 1.57 g of a white fibrous bromo-terminated polymer.

Then, the above bromo-terminated polymer was dissolved in 31 mL of N-methyl pyrrolidone, 3.27 g of quinuclidine was added, and after 5 days of the first substitution reaction at 60° C., the product of the first substitution reaction was slowly added to anhydrous diethyl ether, filtered, and dried to obtain 2.1 g of an off-white fibrous cationic polymer containing a spiro structure.

Application Example 5

According to the method of Application example 1, the counter ion of the ionic polymer containing a spiro structure prepared in Example 5 is subjected to ion exchange as needed to obtain an ionic polymer containing a spiro structure with a counter ion of $HCO_3^-$ as a catalyst binder.

Comparative Example 1

Ionic polymer backbone without a spiro unit: terphenyl backbone structural formula:

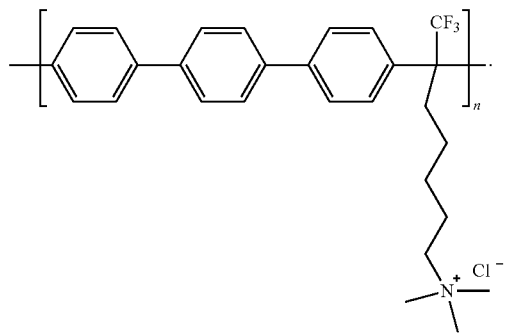

The ionic polymer backbone without the spiro unit terphenyl backbone is prepared by: performing a polycondensation reaction on terphenyl (0.60 g, 2.608 mmol), 7-bromo-1,1,1-trifluoroheptan-2-one (0.71 g, 2.869 mmol), dichloromethane (6.9 mL) and trifluoromethanesulfonic acid (2.4 mL) at room temperature for 20 h to obtain a viscous polymer solution, and after the reaction was complete, dropwise adding the product of the polycondensation reaction to a mixed solvent of methanol and water (1:1) to obtain a white fibrous polymer. The white fibrous polymer was filtered and dried to obtain 1.12 g of a white fibrous bromo-terminated polymer.

Then, the above bromo-terminated polymer was dissolved in 20 mL of N-methylpyrrolidone, 3.9 mL of trimethylamine in ethanol (4.2 mol/L) was added, and after the first substitution reaction at 30° C. for 72 hours, the reaction solution was added to anhydrous diethyl ether, filtered, and dried to obtain 1.10 g of a cationic polymer having a backbone without spiro unit.

Using the above ionic polymer having a backbone free of the spiro unit terphenyl backbone as a starting material, a PTPA membrane is prepared by:

According to the method of Application example 2, an anion exchange membrane with a counter ion of $Br^-$ was prepared by using the ionic polymer with the backbone prepared in comparative example 1 without the spiro cyclic element terphenyl backbone; the difference from Application example 2 is the application of 15 mL of dimethyl sulfoxide.

According to the method of Application example 2, the anions in the above-prepared anion-exchange membrane with the counter ion of $Br^-$ are subjected to ion exchange as needed to obtain an anion-exchange membrane with the counter ion of $Cl^-$ (abbreviated as PTPA membrane).

Anion exchange membrane (abbreviated as PCPTPA membrane) with the counter ion of $Cl^-$ in Application example 2 and catalyst binder with the counter ion of $HCO_3^-$ in Application example 1 prepared from the ionic polymer containing a spiro structure prepared in Example 2 and PTPA membrane in Comparative example 1 were respectively tested to characterize their basic properties.

(1) Water Uptake, Swelling Ratio, and Conductivity

Figure 2:
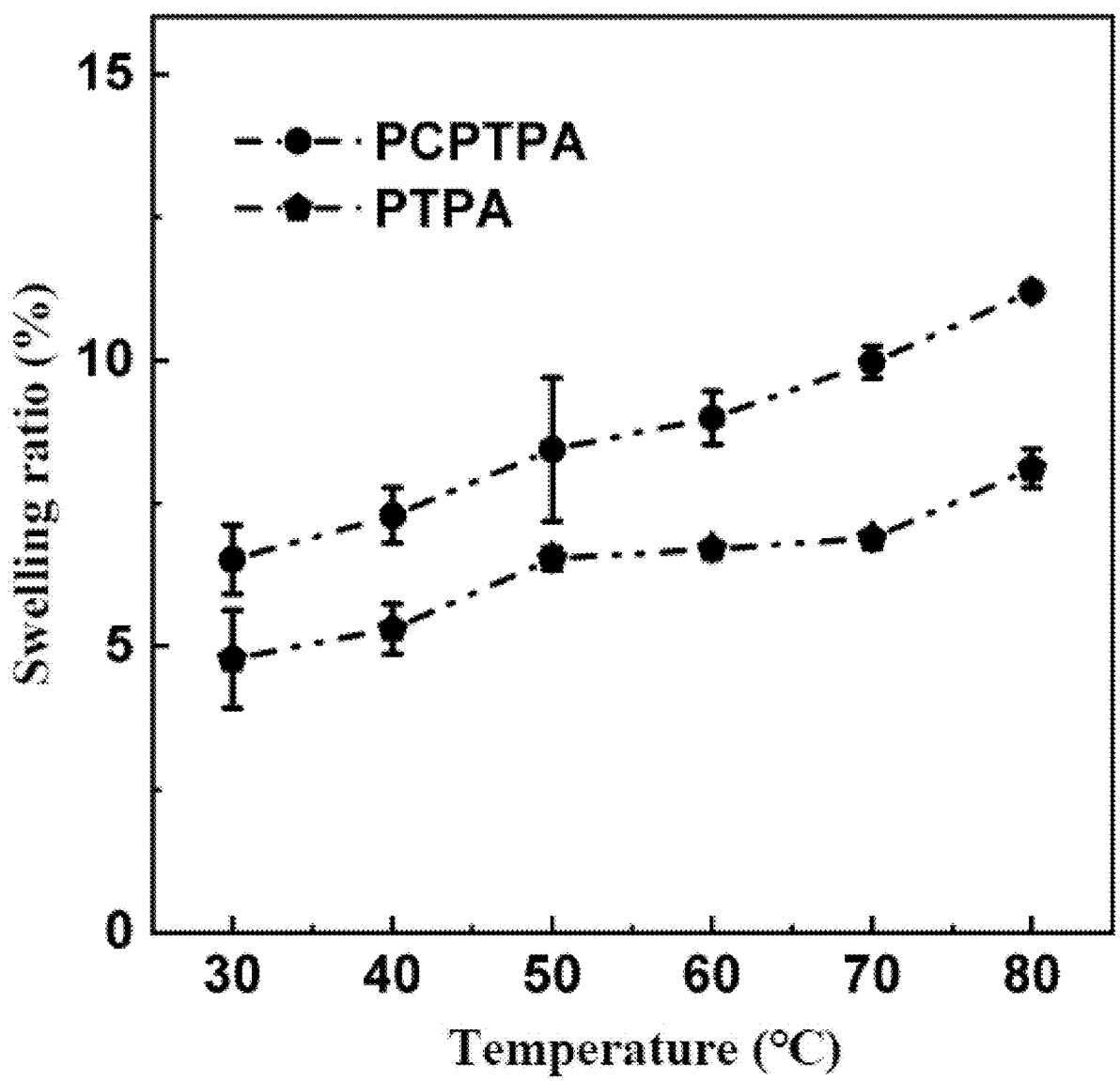
FIG. 2 is a graph of a swelling ratio of the PCPTPA membrane of Application example 2 of the present invention and a PTPA membrane of Comparative example 1 as a function of temperature.

The water uptake and swelling ratio were measured by the soaking method, and graphs showing the water uptake and swelling ratio of the PCPTPA membrane in Application example 2 and the PTPA membrane in Comparative example 1 as a function of temperature are shown in FIGS. 1 and 2. It can be seen from FIGS. 1 and 2 that PCPTPA membranes exhibited higher water uptake and swelling ratios than PTPA membranes without the spiro unit in the backbone. This is due to the loose packing of the polymer backbone in PCPTPA membranes, which is a result of the incorporated spiro structure.

Figure 3:
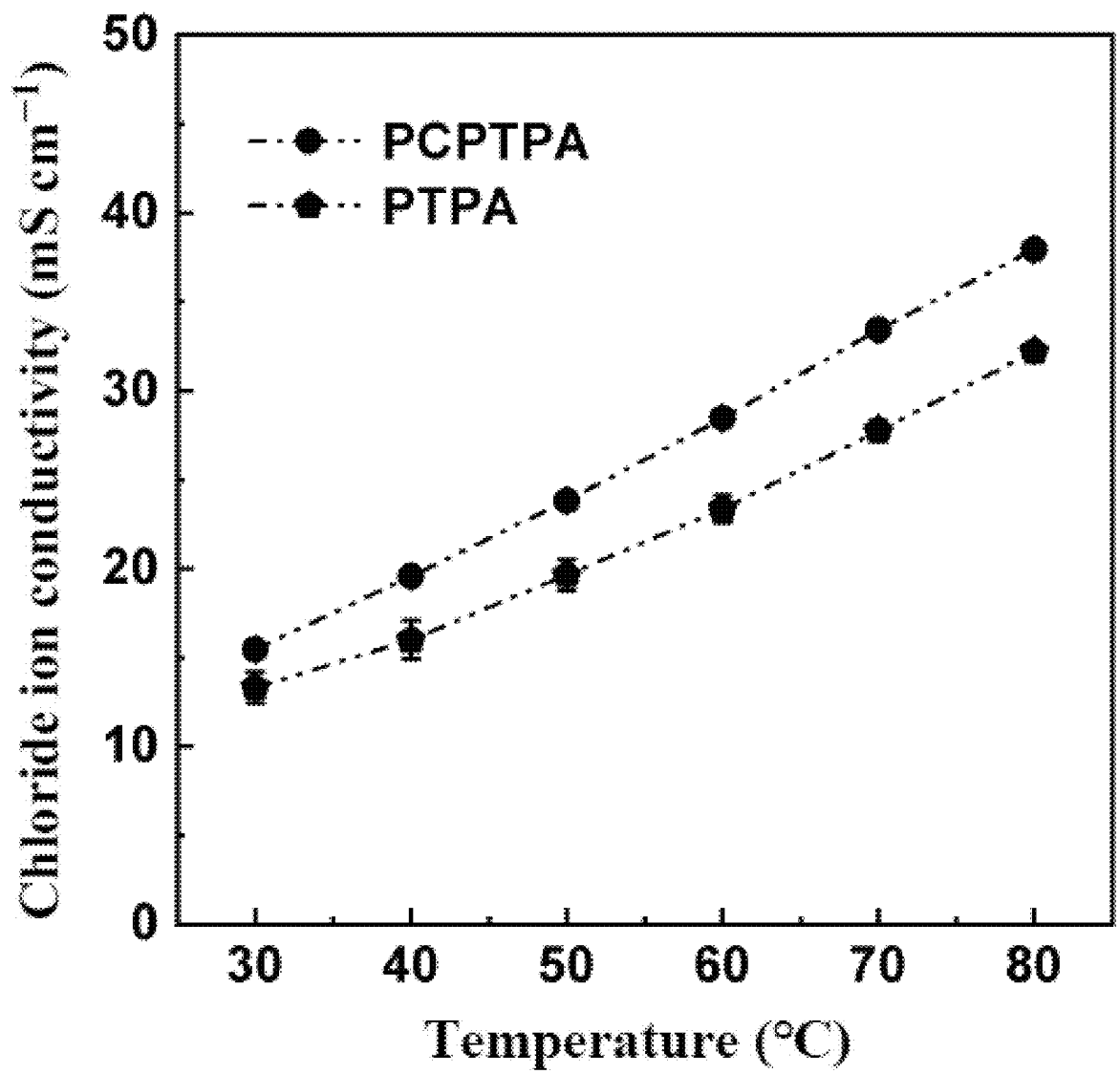
FIG. 3 is a graph of chloride ion conductivity as a function of temperature for the PCPTPA membrane of Application example 2 of the present invention and the PTPA membrane of Comparative example 1.

The four-electrode AC impedance method was used to measure the conductivity, and the graphs of the chloride ion conductivity of the PCPTPA membrane in Application example 2 and the PTPA membrane in Comparative example 1 as a function of temperature are shown in FIG. 3, and it can be seen from FIG. 3 that: at 80° C., the chloride ion conductivity of PCPTPA membrane reaches 38 mS/cm, which is 19% higher than that of PTPA membrane (32 mS/cm).

Alkali Stability

Figure 4:
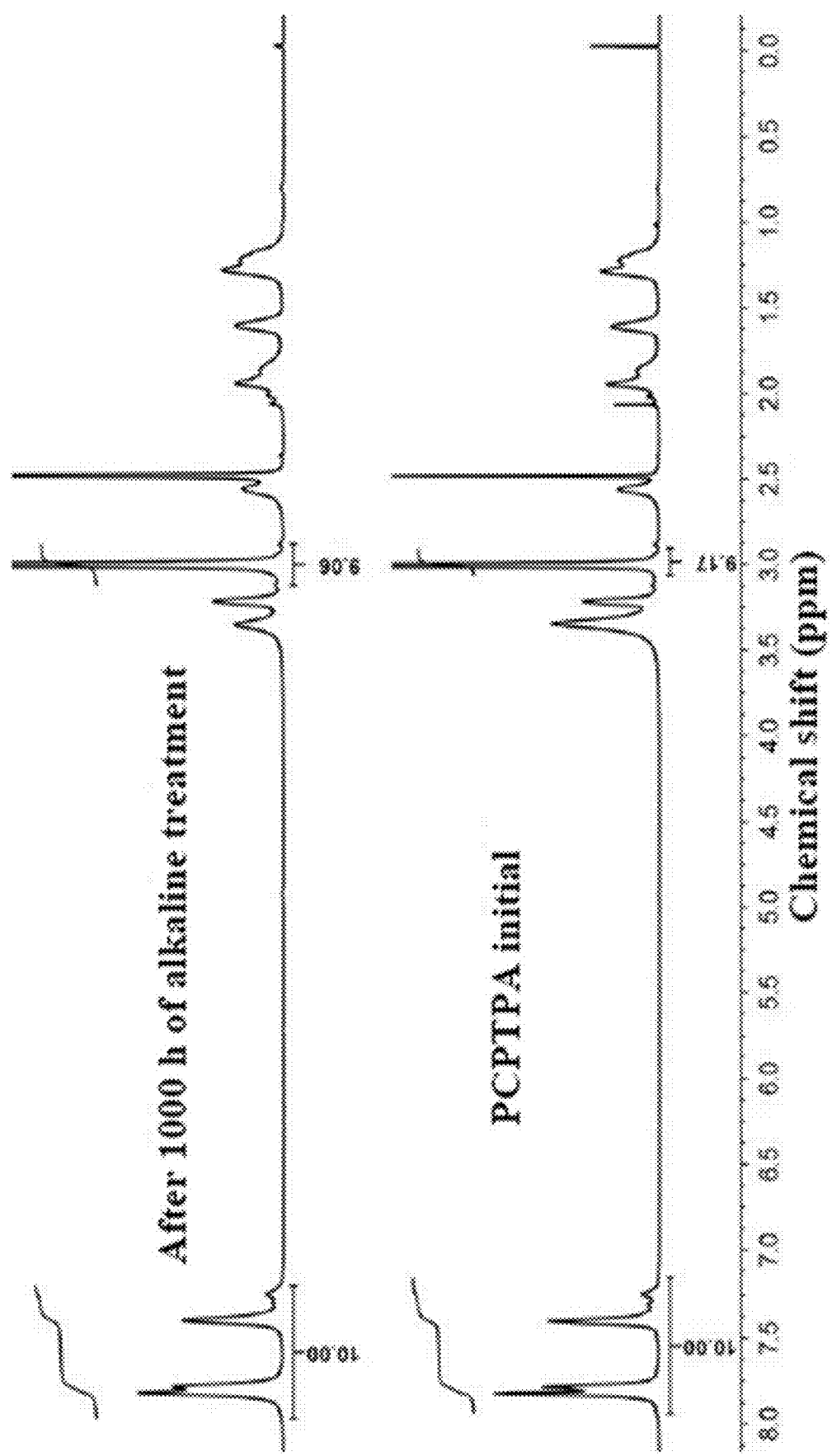
FIG. 4 is a graph of changes before and after alkaline treatment of PCPTPA membrane in Application example 2 according to the present invention.

After the PCPTPA membrane in Application example 2 was subjected to alkaline treatment at 80° C. in an aqueous solution of 1 mol/L NaOH for 1000 hours, the change before and after the nuclear magnetic resonance was observed and the alkaline stability was examined to obtain a plot of the change before and after the alkaline treatment (solvent: DMSO-$d_6$) is shown in FIG. 4. As can be seen from FIG. 4, the content of trimethylammonium groups (3.00 ppm) remains essentially unchanged relative to the integral of chemically inert aromatic protons (7.10 to 8.00 ppm) after 1000 hours of aging of the PCPTPA membrane, demonstrating the strong base durability of the PCPTPA membrane.

(3) Cell Performance

Figure 5:
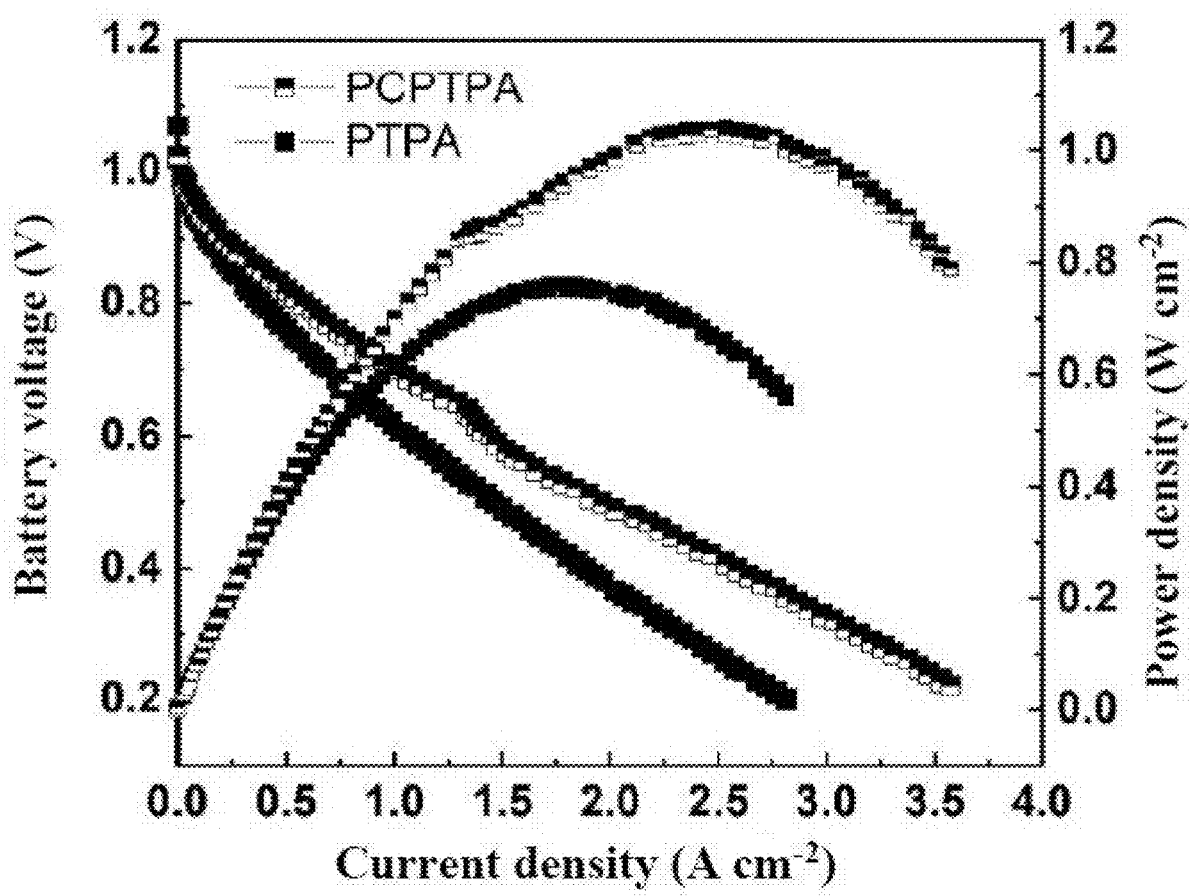
FIG. 5 is a graph of electrochemical performances of PCPTPA membrane in Application example 2 of the present invention and PTPA membrane in Comparative example 1, respectively.

Using the PCPTPA membrane (namely, the anion exchange membrane with the counter ion of $Cl^-$) in Application example 2 and the catalyst binder with the counter ion of $HCO_3^-$ in Application example 1, and the PTPA membrane in comparative example 1 and the catalyst binder with the counter ion of $HCO_3^-$ in Application example 1, Pt/C was employed as both cathode and anode catalysts, with the loading amount of Pt in both the anode and cathode was set at 0.5 mg/cm². A MEA was fabricated by ultrasonic spraying, and an $H_2$—$O_2$ fuel cell test was conducted at 80° C. with a gas flow rate of 300 mL min$^{-1}$. As shown in FIG. 5, the maximum power density of the MEA composed of the PCPTPA membrane reached 1.05 W/cm², whereas the maximum power density of the MEA composed of the PTPA membrane reached 0.76 W/cm². The PCPTPA membrane in Application example 2 and the PTPA membrane in Comparative example 1 were tested as part of an MEA, respectively.

Example 6

An ionic polymer containing a spiro structure has a structure represented by Formula (1-6):

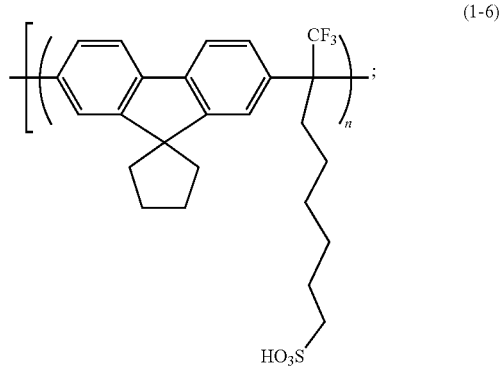

(1-6)

The preparation method of the ionic polymer containing a spiro structure is as follows:
spiro [cyclopentane-1,9'-[9H] fluorene] (0.52 g, 2.3603 mmol), 8-bromo-1,1,1-trifluorooctan-2-one (1.6848 g, 6.4532 mmol), dichloromethane (5.1 mL) and trifluoromethanesulfonic acid (5.1 mL) were subjected to a polycondensation reaction at room temperature for 48 h to obtain a viscous polymer solution. After the polycondensation reaction was complete, the product was slowly added dropwise to a mixed solvent of methanol and water (1:1) to obtain a white fibrous polymer. This polymer was then filtered and washed thoroughly to obtain 1.00 g of a white fibrous bromo-terminated polymer after vacuum drying.

(1) The above-mentioned bromo-terminated polymer was dissolved in 12 mL of N, N-dimethylacetamide, adding potassium thioacetate (2.42 g, 21.2 mmol), heating to 50° C. for a second substitution reaction for 22 h, and cooling to room temperature to obtain a polymer precursor.

(2) To the polymer precursor obtained in the step (1), meta-chloroperoxybenzoic acid (3.65 g, 21.2 mmol) was added for an oxidation reaction for 18 h, and the product of the oxidation reaction was slowly added to 120 mL of a 2 mol/L NaCl solution to obtain 1.01 g of an anionic polymer containing a spiro structure as an off-white fiber.

Application Example 6

The counter ion of the ionic polymer containing a spiro structure prepared in Example 6 was exchanged into a cation H⁺ by ion exchange as needed, the procedure was: soaking the ionic polymer containing a spiro structure in a 2 mol/L $H_2SO_4$ solution for 24 h, and washing with deionized water to obtain an ionic polymer containing a spiro structure with a counter ion of H⁺ as a catalyst binder.

The ionic polymer containing a spiro structure prepared in Example 6 was dissolved in 10.4 mL of dimethyl sulfoxide to obtain a polymer solution, and after filtration, the solution was coated on a clean glass plate by a solution casting method, and the glass plate was placed in a thermoventilated oven at 80° C. for 24 h to evaporate the solvent; after the temperature was cooled to room temperature, the glass plate was taken out, and it was subjected to de-membrane in deionized water, and after thorough washing with deionized water, a proton exchange membrane with a counter ion of Na⁺ was obtained.

The counter ion in the above-mentioned prepared proton exchange membrane of which the counter ion is Na⁺ is exchanged into a cation H⁺ by ion exchange as needed, the steps being: the prepared proton exchange membrane with a counter ion of Na⁺ was immersed in a 2 mol/L $H_2SO_4$ solution for 24 h, and then washed with deionized water thoroughly to obtain a proton exchange membrane with a counter ion of H⁺.

Example 7

An ionic polymer containing a spiro structure has a structural formula represented by Formula (1-7):

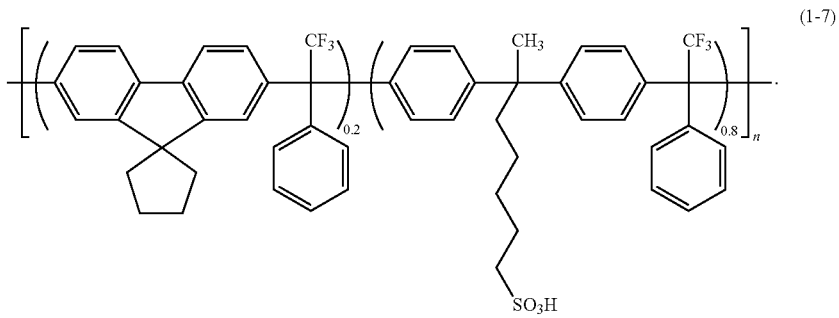

(1-7)

The preparation method of the ionic polymer containing a spiro structure is as follows: spiro [cyclopentane-1,9'-[9H] fluorene] (0.12 g, 0.5447 mmol), 7,7,7-trifluoro-6,6-diphenyl-1-bromoheptane (0.72 g, 2.1788 mmol), 2,2,2-trifluoroacetophenone (1.67 g, 9.5675 mmol), dichloromethane (5.6 mL) and trifluoromethanesulfonic acid (5.6 mL) were subjected to a polycondensation reaction at room temperature for 24 h to obtain a viscous polymer solution. After the polycondensation reaction was complete, the product of the polycondensation reaction was slowly added dropwise to a mixed solvent of methanol and water (1:1) to obtain a white fibrous polymer. Then, it was filtered and washed thoroughly, and after vacuum drying, 1.17 g of a white fibrous bromo-terminated polymer was obtained.

(1) The above-mentioned bromo-terminated polymer was dissolved in 13.7 mL of N, N-dimethylacetamide, adding potassium thioacetate (2.13 g, 18.6 mmol), heating to 50° C. for a second substitution reaction for 10 h, and cooling to room temperature to obtain a polymer precursor.

(2) To the polymer precursor obtained in the step (1), meta-chloroperoxybenzoic acid (3.22 g, 18.6 mmol) was added for an oxidation reaction for 10 h, and the product of the oxidation reaction was slowly added to 137 mL of a 2 mol/L NaCl solution to obtain 1.15 g of an anionic polymer containing a spiro structure as an off-white fiber.

Application Example 7

Proton exchange membranes with Na$^+$ counter ions were prepared according to the method of Application example 6 using the ionic polymer containing a spiro structure prepared in Example 7, which is different from Example 6 by using 12.1 mL of dimethyl sulfoxide.

According to the method of Application example 6, the counter ion in the above-prepared proton exchange membrane with the counter ion of Na$^+$ is subjected to ion exchange as needed to obtain a proton exchange membrane with the counter ion of Na$^+$.

Example 8

In this example, the ionic polymer containing a spiro structure has a structural formula represented by formula (1-8):

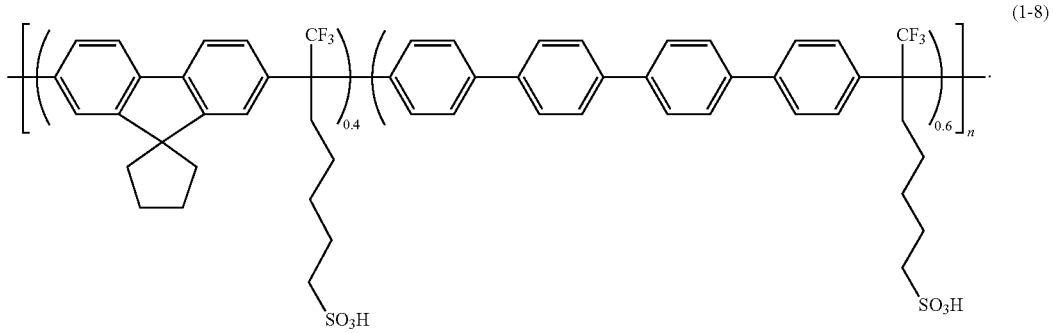

The preparation method of the ionic polymer containing a spiro structure is as follows: spiro [cyclopentane-1,9'-[9H] fluorene] (0.20 g, 0.9078 mmol), para-quaterphenyl (0.42 g, 1.3617 mmol), 7-bromo-1,1,1-trifluoroheptan-2-one (1.1337 g, 4.5892 mmol), dichloromethane (5.7 mL) and trifluoromethanesulfonic acid (5.7 mL) were subjected to a polycondensation reaction at room temperature for 36 h to obtain a viscous polymer solution. The product was slowly dropped into a mixed solvent (1:1) of methanol and water to obtain a white fibrous polymer. The white fibrous polymer was filtered and dried to obtain 1.05 g of bromo-terminated polymer.

(1) The above-mentioned bromo-terminated polymer precursor was dissolved in 12.5 mL of N, N-dimethylacetamide, adding potassium thioacetate (2.81 g, 24.5 mmol), heating to 50° C. for a second substitution reaction for 15 h, and cooling to room temperature to obtain a polymer precursor.

(2) To the polymer precursor obtained in the step (1), meta-chloroperoxybenzoic acid (4.24 g, 24.5 mmol) was added for an oxidation reaction for 20 h, and the product of the oxidation reaction was slowly added to 125 mL of a 2 mol/L NaCl solution to obtain 1.05 g of an anionic polymer containing a spiro structure as an off-white fiber.

Application Example 8

Proton exchange membranes with Na$^+$ counter ions were prepared according to the method of Application example 6 using the ionic polymer containing a spiro structure prepared in Example 8, which is different from Example 6 by using 10.8 mL of dimethyl sulfoxide.

According to the method of Application example 6, the counter ion in the above-prepared proton exchange mem brane with the counter ion of Na⁺ is subjected to ion exchange as needed to obtain a proton exchange membrane with the counter ion of H⁺.

Example 9

An ionic polymer containing a spiro structure has a structural formula represented by Formula (1-9):

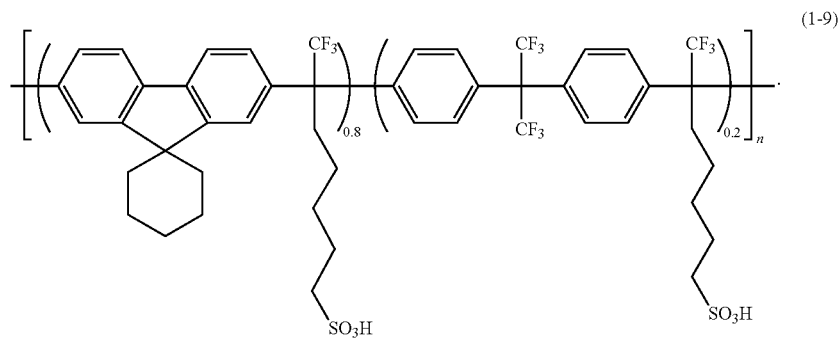

(1-9)

The preparation method of the ionic polymer containing a spiro structure is as follows: spiro [cyclohexane-1,9'-[9H] fluorene] (0.66 g, 2.8 mmol), hexafluoro-2,2-diphenylpropane (0.21 g, 0.7 mmol), 7-bromo-1,1,1-trifluoroheptan-2-one (1.81 g, 7.3 mmol), dichloromethane (3.6 mL) and trifluoromethanesulfonic acid (3.6 mL) were reacted at room temperature for 36 h to obtain a viscous polymer solution. After the reaction was complete, it was slowly added dropwise to a mixed solvent (1:1) of methanol and water to obtain a white fibrous polymer. The white fibrous polymer was filtered and dried to obtain 1.58 g of bromo-terminated polymer.

(1) The above-mentioned bromo-terminated polymer was dissolved in 19 mL of N, N-dimethylacetamide, adding potassium thioacetate (3.08 g, 27.0 mmol), heating to 50° C. for a second substitution reaction for 14 h, and cooling to room temperature to obtain a polymer precursor.

(2) To the polymer precursor obtained in the step (1), meta-chloroperoxybenzoic acid (4.66 g, 27.0 mmol) was added for an oxidation reaction for 19 h, and the product of the oxidation reaction was slowly added to 190 mL of a 2 mol/L NaCl solution to obtain 1.51 g of an anionic polymer containing a spiro structure as an off-white fiber.

Application Example 9

According to the method of Application example 6, the counter ion of the ionic polymer containing a spiro structure prepared in Example 9 is subjected to ion exchange as needed to obtain an ionic polymer containing a spiro structure with a counter ion of H⁺ as a catalyst binder.

Example 10

An ionic polymer containing a spiro structure has a structural formula represented by Formula (1-10):

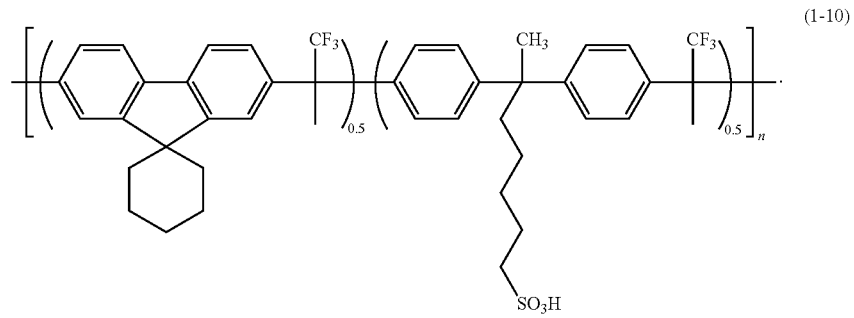

(1-10)

The preparation method of the ionic polymer containing a spiro structure is as follows: spiro [cyclohexane-1,9'-[9H] fluorene] (0.32 g, 1.3 mmol), 7,7,7-trifluoro-6,6-diphenyl-1-bromoheptane (0.45 g, 1.3 mmol), 1,1,1-trifluoroacetone (1.06 g, 9.3 mmol), dichloromethane (5.6 mL) and trifluoromethanesulfonic acid (5.6 mL) were reacted at room temperature for 11 h to obtain a viscous polymer solution. After the reaction was complete, it was slowly added dropwise to a mixed solvent (1:1) of methanol and water to obtain a white fibrous polymer, which was filtered and dried to obtain 1.10 g of a bromo-terminated polymer.

(1) The above-mentioned bromo-terminated polymer precursor was dissolved in 11 mL of N, N-dimethylacetamide before adding potassium thioacetate (1.38 g, 12.1 mmol), and carrying out a second substitution reaction at room temperature for 24 h to obtain a polymer precursor.

(2) To the polymer precursor obtained in the step (1), m-chloroperoxybenzoic acid (2.09 g, 12.1 mmol) was added and oxidized for 22 h, and the product of the oxidation was added to 110 mL of a 2 mol/L NaCl solution to obtain 1.05 g of an anionic polymer containing a spiro structure in the form of an off-white fiber.

Application Example 10

Proton exchange membranes with $Na^+$ counter ions were prepared according to the method of Application example 6 using the ionic polymer containing a spiro structure prepared in Example 10, which is different from Example 6 by using 9 mL of dimethyl sulfoxide.

According to the method of Application example 6, the counter ion in the above-prepared proton exchange membrane with the counter ion of $Na^+$ is subjected to ion exchange as needed to obtain a proton exchange membrane with the counter ion of $Na^+$.

Example 11

An ionic polymer containing a spiro structure has a structural formula represented by Formula (1-11):

polymer solution. After the polycondensation reaction was complete, the product of the polycondensation reaction was slowly dropped into a mixed solvent (1:1) of methanol and water to obtain a white fibrous polymer. It was then filtered and washed thoroughly. After vacuum drying, 0.31 g of a white fibrous bromo-terminated polymer was obtained.

(1) The above-mentioned bromo-terminated polymer was dissolved in 8 mL of N, N-dimethylacetamide, adding potassium thioacetate (2.03 g, 17.8 mmol), heating to 50° C. for 22 h, and cooling to room temperature to obtain a polymer precursor.

(2) To the polymer precursor obtained in the step (1), m-chloroperoxybenzoic acid (3.07 g, 17.8 mmol) was added and oxidized for 19 h, and the product of the oxidation was slowly added to 160 mL of a 2 mol/L NaCl solution to obtain 0.30 g of an anionic polymer containing a spiro structure as an off-white fiber.

Application Example 11

According to the method of Application example 6, the counter ion of the ionic polymer containing a spiro structure prepared in Example 11 is subjected to ion exchange as needed to obtain an ionic polymer containing a spiro structure with a counter ion of $H^+$ as a catalyst binder.

The proton exchange membrane and the catalyst binder in Application examples 6 to 11 prepared from the ionic polymer containing a spiro structure prepared in Examples 6 to 11 were respectively tested to evaluate their basic properties.

Figure 6:
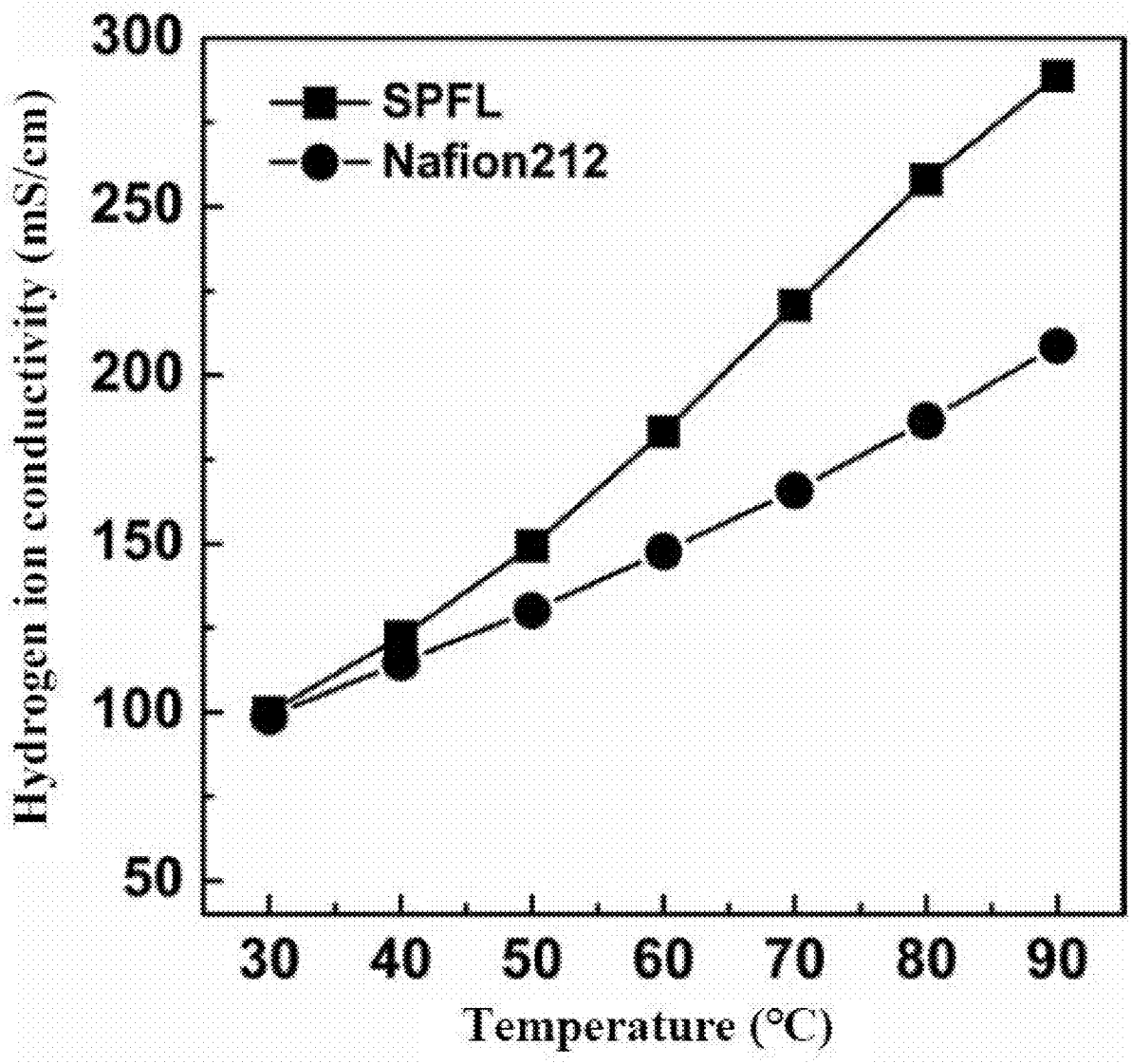
FIG. 6 is a graph of hydrogen ion conductivity as a function of temperature for SPFL membrane in Application example 6 of the present invention and commercial Nafion 212 membrane.

FIG. 6 is a graph showing the variation of the hydrogen ion conductivity with the temperature of the proton exchange membrane SPFL membrane and the Nafion 212 membrane. The counter ion prepared from the ionic polymer containing a spiro structure in Example 6 is a hydrogen ion, and it can be seen from FIG. 6 that: the hydrogen ion conductivity of the SPFL membrane reaches 289 mS/cm, which is 38% higher than that of the Nafion 212 membrane (209 mS/cm).

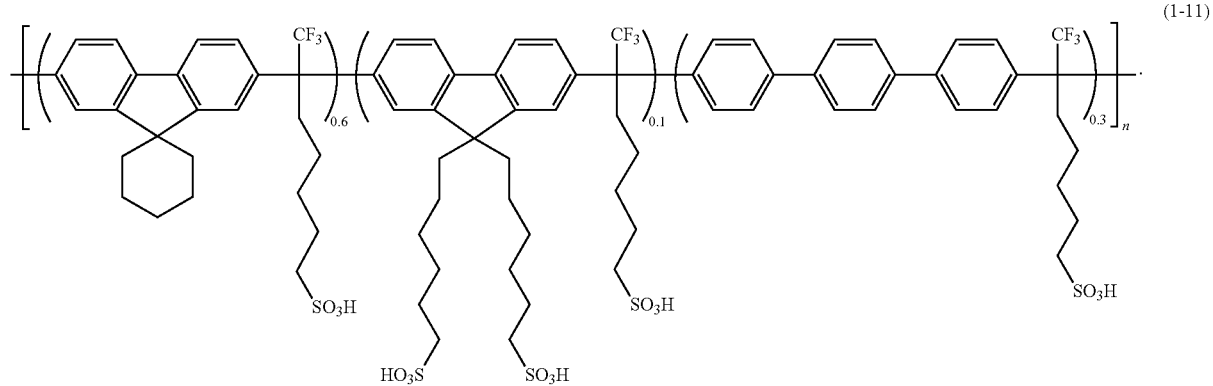

Figure 7:
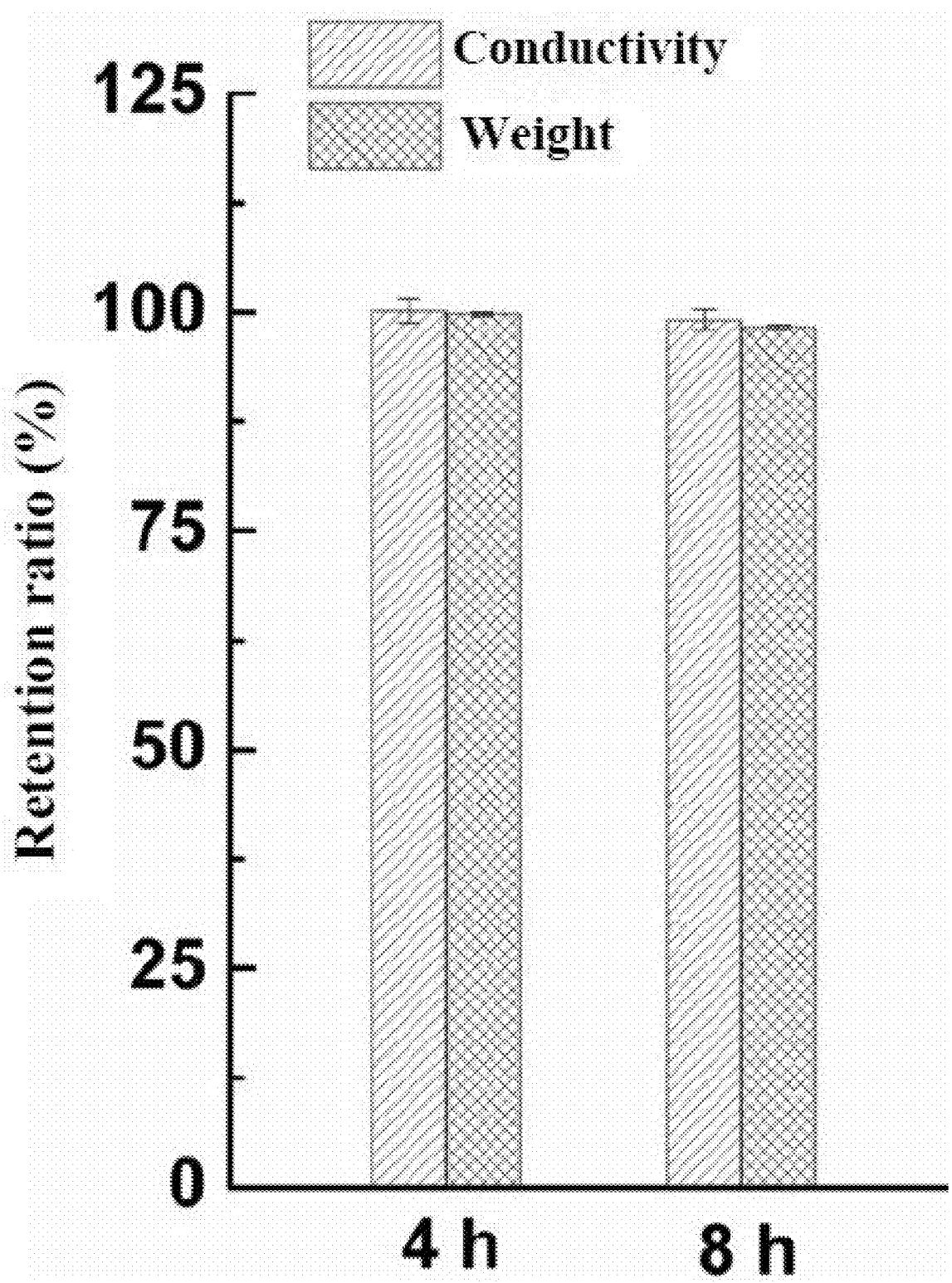
FIG. 7 is a graph of an oxidative stability test of a proton exchange membrane with hydrogen ion as counter ion in Application example 7 of the present invention at 80° C. in a 3 ppm $Fe^{2+}$, 3% $H_2O_2$ solution.

The preparation method of the ionic polymer containing a spiro structure is as follows: spiro [cyclohexane-1,9'-[9H] fluorene] (0.20 g, 0.8 mmol), 9,9-bis (6-bromohexyl)-9H-fluorene (0.07 g, 0.1 mmol), p-terphenyl (0.09 g, 0.4 mmol), 7-bromo-1,1,1-trifluoroheptan-2-one (2.68 g, 10.9 mmol), dichloromethane (12.4 mL) and trifluoromethanesulfonic acid (12.4 mL) were subjected to a polycondensation reaction at room temperature for 16 h to obtain a viscous The oxidative stability is important for the practical application of ionic polymers. FIG. 7 is a graph showing changes in conductivity and weight of a proton exchange membrane of Application example 7 in which a counter ion is a hydrogen ion, prepared from an ionic polymer containing a spiro structure of Example 7, after oxidative stability testing in a 3 ppm $Fe^{2+}$, 3% $H_2O_2$ solution at 80° C. for 4 hours and 8 hours. It can be seen from FIG. 7 that the weight and conductivity of the proton exchange membrane with the counter ion of hydrogen ion in Application example 7 do not significantly decrease after soaking for 4 hours, indicating that the polymer with a spiro structure in Application example 7 has excellent oxidative stability, and the conductivity and weight of the proton exchange membrane decrease by 0.9% and 1.7% after soaking for 8 hours in Fenton reagent, respectively.

Figure 8:
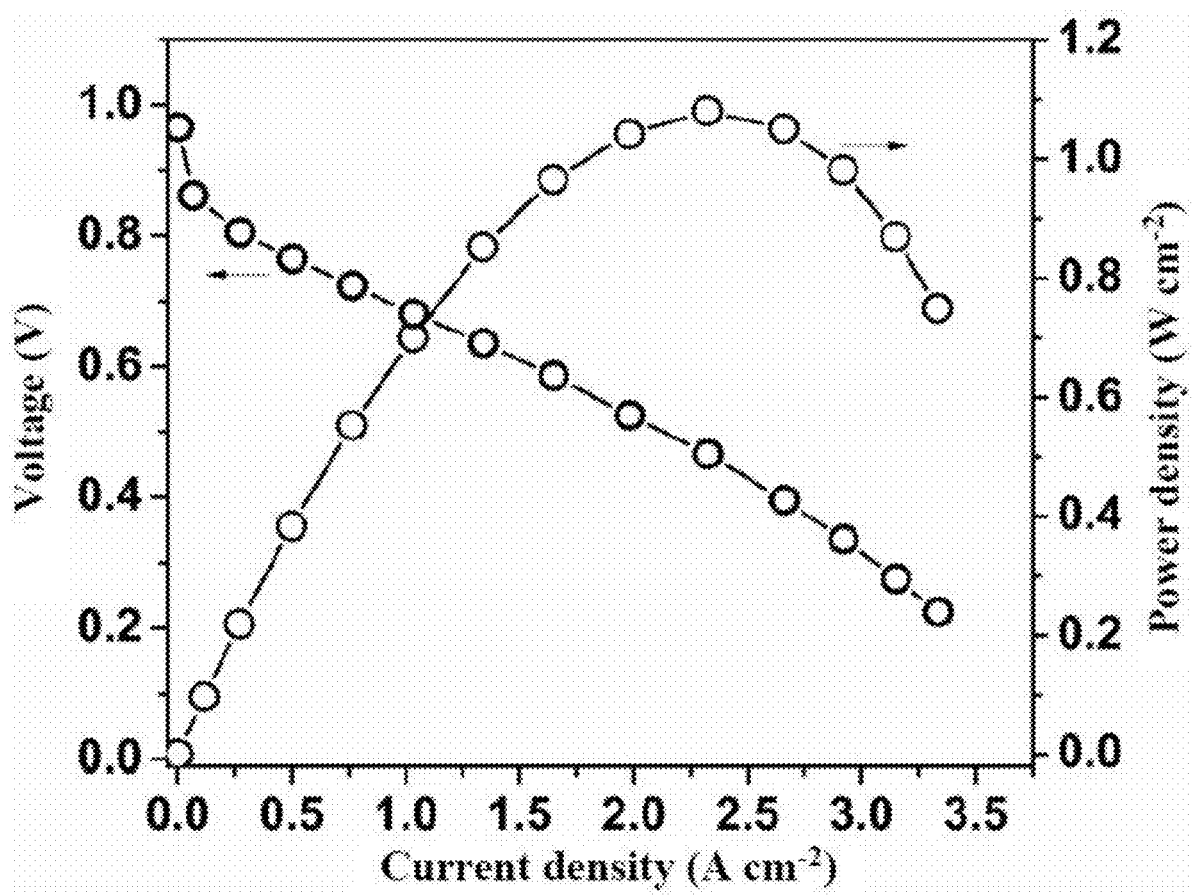
FIG. 8 is an electrochemical performance diagram of a proton exchange membrane with a counter ion of a hydrogen ion in Application example 8 according to the present invention.

A proton exchange membrane with a hydrogen ion as a counter ion in Application example 8, which was prepared using the ionic polymer containing a spiro structure in Example 8, the ionic polymer containing a spiro structure in Example 6 as a binder for a catalyst layer, Pt/C as a catalyst for a cathode and an anode, the Pt loading amount in the anode and cathode is 0.2 mg/cm², are used, and the assembled MEA is subjected to $H_2$—$O_2$ fuel cell test at 80° C., with a gas flow rate of 100 mL/min, a back pressure of 100 kPa, and a relative humidity (RH) of 30%. The electrochemical performance of the membrane electrode of the proton exchange membrane whose counter ion is hydrogen ion in Example 8 is shown in FIG. 8, it can be seen from FIG. 8 that the maximum power density of the MEA of the proton exchange membrane in which the counter ion is hydrogen ion in Application example 8 reaches 1.09 W/cm².

Figure 9:
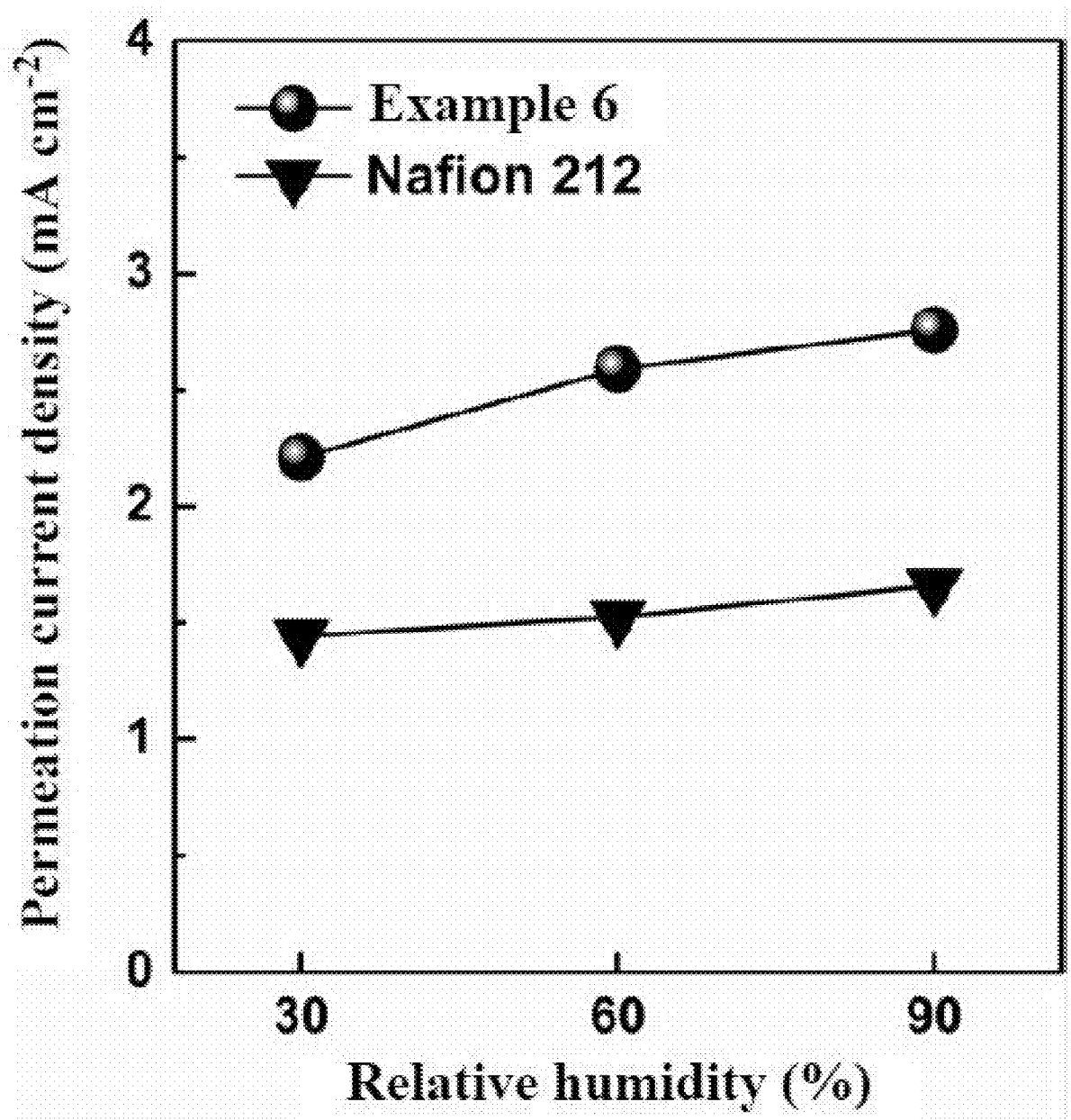
FIG. 9 is a graph showing the gas permeation current density of the ion exchange membrane with a spiro structure prepared in Application example 6 according to the present invention and Nafion 212.

FIG. 9 is a graph showing the gas permeation current density of the ion exchange membrane having a spiro structure prepared in Application example 6 and the commercial Nafion212 membrane, and it can be seen from FIG. 9 that the ionic membrane having a spiro structure prepared in Application example 6 has a higher gas permeation current density than Nafion212, indicating that the ionic membrane with a spiro structure prepared in Application example 6 has better gas permeability.

In light of the above, the present invention provides an ionic polymer containing a spiro structure. By incorporating a spiro fragment with a medium-large free volume into the polymer main chain, the ionic polymer exhibits improved solubility, gas permeability, and ion conductivity while maintaining good adhesiveness, mechanical properties, and dimensional stability. This contributes to enhanced gas permeability in the catalyst layer prepared from the ionic polymer, serving as either a catalyst binder for a PEMFC or an AEMFC. Moreover, the reactant gas can more easily reach the surface of the catalyst, facilitating the electrochemical reaction within the fuel cell and improving its overall electrochemical performance. Proton exchange membranes and anion exchange membranes derived from ionic polymers containing spiro structures benefit from the increased space volume provided by the large free volume spiro fragments, leading to enhanced conductivity of both types of membranes.

While the foregoing is directed to the preferred embodiment of the present invention, it will be understood by those skilled in the art that various changes may be made and equivalents may be substituted for elements thereof without departing from the spirit and scope of the invention.

What is claimed is:

1. An ionic polymer containing a spiro structure, having a structure as shown in Formula I:

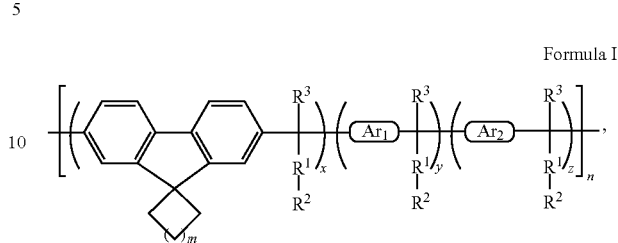

Formula I wherein m in Formula I determines the size of the spiro, and m is independently an integer between 2 and 4;

x in Formula I is any number between 0.01 and 1.00, y and z are each independently any number between 0 and 0.99, x+y+z=1, and when z is 0, $R^2$ contains at least a cationic group;

n in Formula I represents a degree of polymerization, and n is an integer between 10 and 1,000,000;

each $R^1$ in Formula I is:

$$-\{-(CH_2)_p-\}-;$$

p being an integer between 1 and 15;

each $R^2$ in Formula I is independently selected from a hydrogen atom or a cationic group, in which case the ionic polymer of the structure shown in Formula I is a cationic polymer containing a spiro structure, and a counter ion is an anion; wherein $R^2$ is selected from one or more of the following structures:

and when z=0, $R^2$ in x and y units cannot simultaneously be a hydrogen atom; $R^{01}$, $R^{02}$, $R^{03}$, $R^{04}$, and $R^{05}$ are each independently selected from a hydrocarbyl with the carbon atom number of 1 to 10; a counter anion $A^-$ is selected from a halide ion, a hydroxide ion, or a bicarbonate ion; when the polymer of the structure shown in Formula I is the cationic polymer containing the spiro structure, $R^4$ in —$Ar_2$— fragment is a quaternary ammonium cationic group if z is not 0;

each R³ in Formula I is independently selected from one or more of the following structures:

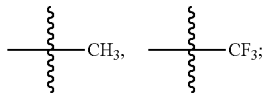

each —Ar₁— fragment in Formula I is independently selected from one or more of the following structures:

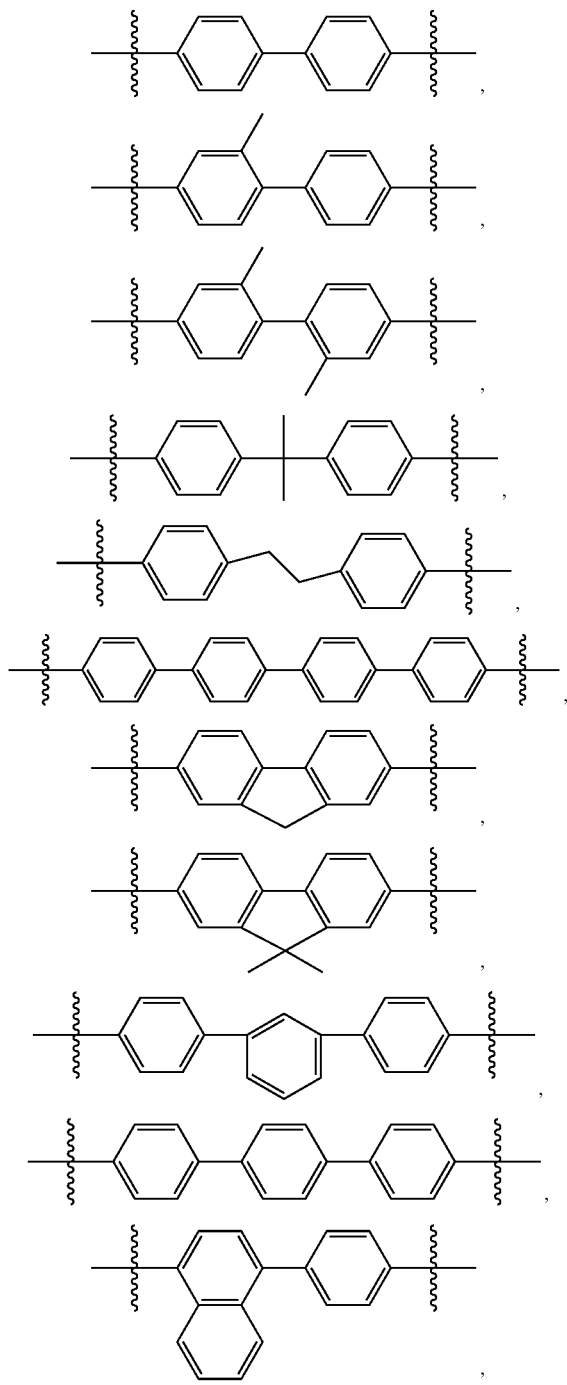

the —Ar₂— fragment in Formula I is the following structure with ionic groups:

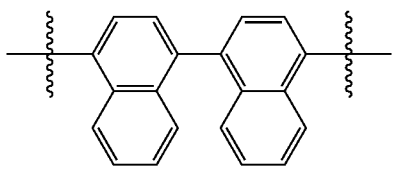

each R' being independently selected from the alkylene or arylene groups with the carbon atom number of 1 to 15; R⁴ being a cationic group from one or more of the following structures:

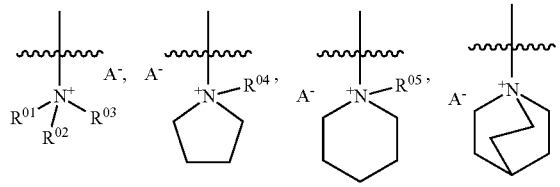

$R^{01}$, $R^{02}$, $R^{03}$, $R^{04}$, and $R^{05}$ being each independently selected from a hydrocarbyl with the carbon atom number of 1 to 10; a counter ion A⁻ being selected from a halide ion, a hydroxide ion, or a bicarbonate ion.

2. The ionic polymer containing a spiro structure according to claim 1, wherein each R¹ in Formula I is independently selected from one or more of the following structures:

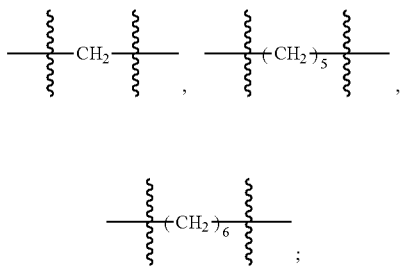

R² in Formula I is independently selected from the hydrogen atom or the cationic group, in which case the ionic polymer of the structure shown in Formula I is the cationic polymer containing the spiro structure, and the counter ion is the anion; R² is independently selected from

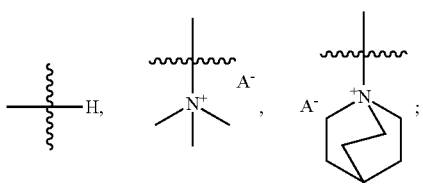

each —Ar$_1$— fragment in Formula I is independently selected from one or more of the following structures:

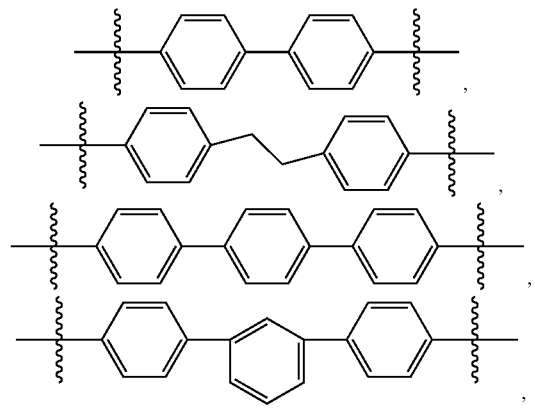

each the —Ar$_2$— fragment in Formula I is independently selected from one or more of the following structures:

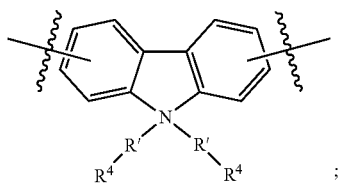

each R' being independently selected from an alkylene or an arylene group with the carbon atom number of 1 to 15; R$^4$ being a cationic group.

3. A preparation method of the ionic polymer containing a spiro structure according to claim 1, wherein when each R$^2$ in Formula I is independently selected from one or more of

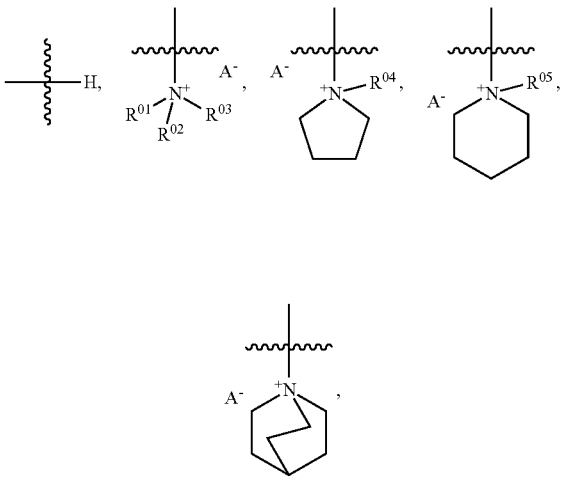

R$^4$ in Formula I is the quaternary ammonium cation, having one or more of the following structures:

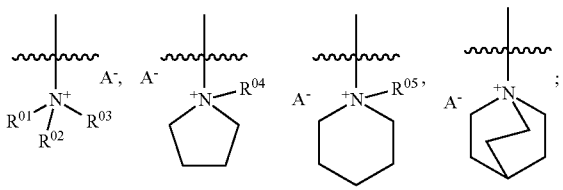

R$^{01}$, R$^{02}$, R$^{03}$, R$^{04}$, and R$^{05}$ being each independently selected from a hydrocarbyl with the carbon atom number of 1 to 10; a counter ion A$^-$ being selected from a halide ion, a hydroxide ion, or a bicarbonate ion;

the ionic polymer of the structure shown in Formula I is a cationic polymer containing a spiro structure, and a preparation method of the cationic polymer containing the spiro structure comprises the following steps:

mixing a halogen-terminated polymer precursor with the structure shown in Formula II, a first organic solvent, and a tertiary amine compound, and then carrying out a first substitution reaction to obtain the cationic polymer containing the spiro structure, Formula II

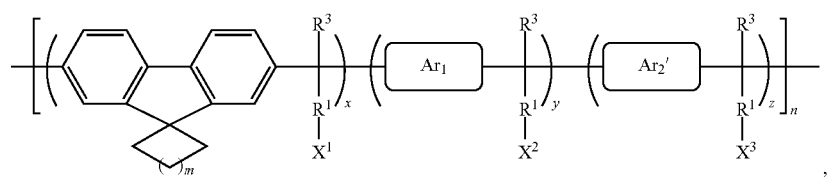

in Formula II, $X^1$, $X^2$, and $X^3$ being each independently selected from a halogen atom or a hydrogen atom, and when z=0, $X^1$ and $X^2$ being not hydrogen atoms at the same time;

in Formula II, $Ar_2'$ is an arylene unit tethering with halogen atoms, having the following structure:

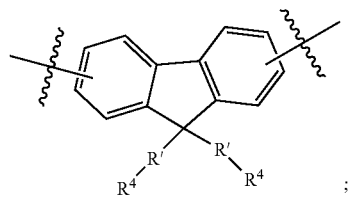

each R' being independently selected from an alkylene or an arylene group with the carbon atom number of 1 to 15, and $X^4$ being a halogen atom selected from one or more of Cl, Br, and I; and the tertiary amine compound being selected from one or more of

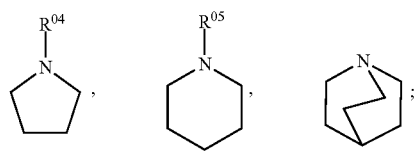

$R^{01}$, $R^{02}$, $R^{03}$, $R^{04}$, and $R^{05}$ being each independently selected from a hydrocarbyl with the carbon atom number of 1 to 10.

4. The preparation method of the ionic polymer containing a spiro structure according to claim 3, wherein a preparation method of the halogen-terminated polymer precursor with the structure shown in Formula II comprises the following steps:

performing a polycondensation reaction after mixing a spiro-containing aromatic compound, $Ar_1'$, $Ar_2''$, a ketone monomer, and a second organic solvent and an organic strong acid, to obtain the halogen-terminated polymer precursor with the structure shown in Formula II, wherein the polycondensation reaction is shown in Formula III,

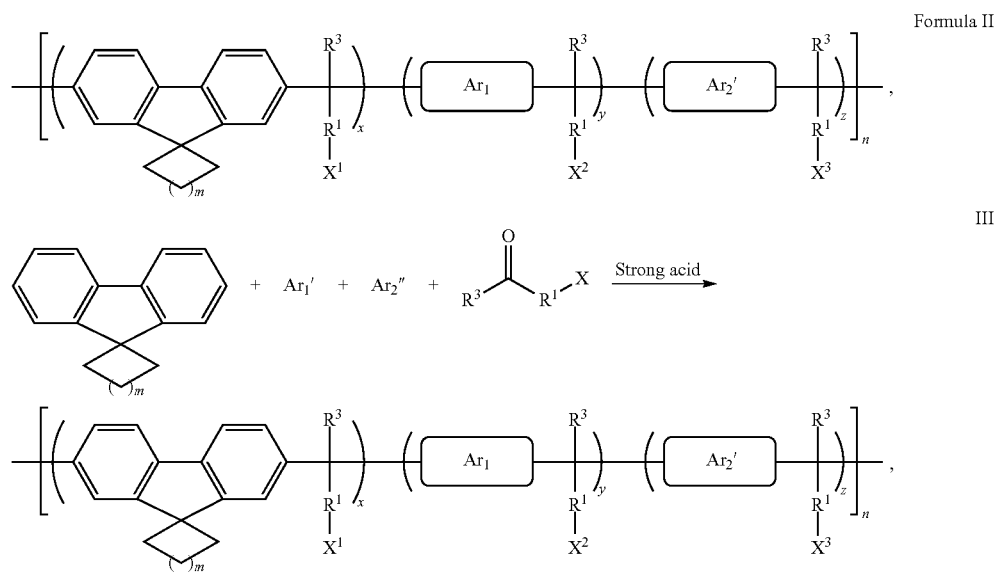

wherein in Formula III, when the amount of $Ar_1'$ as a raw material is zero, y=0; in Formula III, when the amount of $Ar_2''$ as a raw material is zero, z=0;

in Formula III, X is independently selected from a halogen atom or a hydrogen atom, $X^1$, $X^2$, and $X^3$ are each independently selected from a halogen atom or a hydrogen atom, and when z=0, $X^1$ and $X^2$ are not hydrogen atoms at the same time;

the spiro-containing aromatic compound has one or more of the following structures:

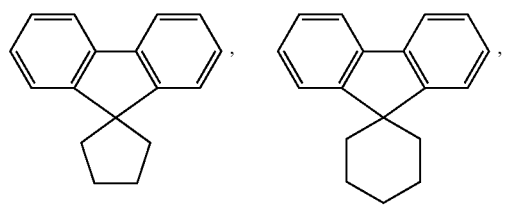

-continued

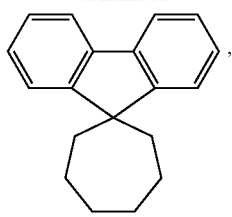

a structure of the ketone monomer is

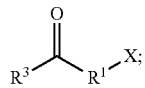

$Ar_1'$ is an aromatic compound having one or more of the following structures:

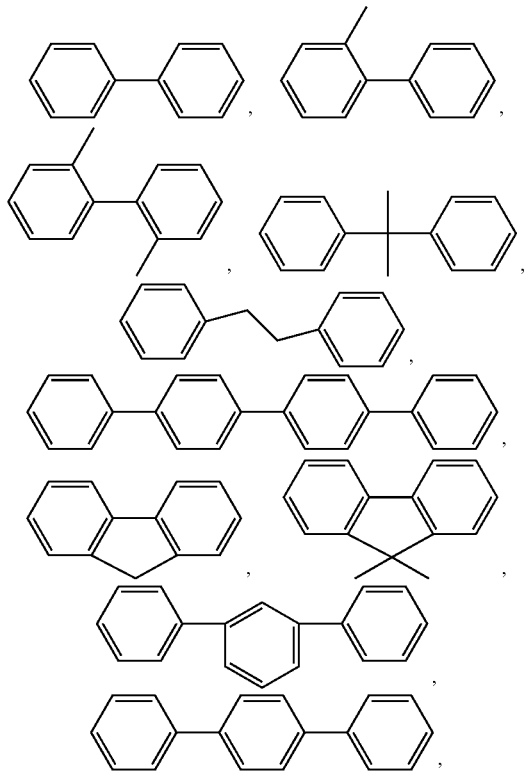

-continued

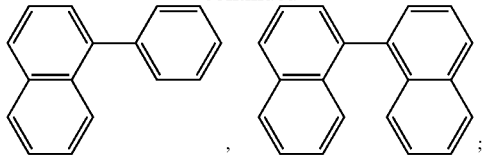

$Ar_2''$ is an aromatic compound tethering with halogen group, having the structure of:

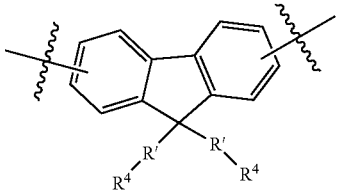

each R' being independently selected from an alkylene or an arylene group with the carbon atom number of 1 to 15, and $X^4$ being a halogen atom selected from one or more of Cl, Br, and I; and the strong organic acid is at least one of methanesulfonic acid, trifluoromethanesulfonic acid, and trifluoroacetic acid.

5. The ionic polymer containing a spiro structure according to claim 1 wherein the ionic polymer containing a spiro structure is used as a catalyst binder for an anion exchange membrane fuel cell (AEMFC).

6. The ionic polymer containing a spiro structure according to claim 5, wherein counter ions in the ionic polymer containing a spiro structure are converted into counter ions as needed before the ionic polymer containing a spiro structure is used as the catalyst binder for the AEMFC.

7. The ionic polymer containing a spiro structure according to claim 1 wherein the ionic polymer containing a spiro structure is used in preparation of an anion exchange membrane.

8. The ionic polymer containing a spiro structure according to claim 7, wherein a method for preparing the anion exchange membrane using the ionic polymer containing a spiro structure comprises the following steps:
dissolving or dispersing the ionic polymer containing a spiro structure in an organic solvent to acquire a solution or dispersion of the ionic polymer;
coating the solution or dispersion of the polymer on a substrate and then removing the solvent to obtain the anion exchange membrane; and
converting counter ions in the anion exchange membrane into other kinds of counter ions as needed.

* * * * *